United States Patent [19]
Glendening et al.

[11] Patent Number: 5,636,373
[45] Date of Patent: Jun. 3, 1997

[54] SYSTEM FOR SYNCHRONIZING LOGICAL CLOCK IN LOGICAL PARTITION OF HOST PROCESSOR WITH EXTERNAL TIME SOURCE BY COMBINING CLOCK ADJUSTMENT VALUE WITH SPECIFIC VALUE OF PARTITION

[75] Inventors: Beth A. Glendening, Poughkeepsie; Roger E. Hough, Highland; Karen Udy, Wappingers Falls; Stephanie W. W. Zhang, Binghamton, all of N.Y.

[73] Assignee: International Business Machines Corporation, Armonk, N.Y.

[21] Appl. No.: 168,281

[22] Filed: Dec. 15, 1993

Related U.S. Application Data

[63] Continuation of Ser. No. 754,815, Sep. 4, 1991, abandoned.

[51] Int. Cl.$^6$ ............................................. G06F 1/04
[52] U.S. Cl. ............................................. 395/551
[58] Field of Search .................................... 395/275, 550, 395/200, 551, 555; 375/356, 357, 371, 375

[56] References Cited

U.S. PATENT DOCUMENTS

| | | | |
|---|---|---|---|
| 3,932,847 | 1/1976 | Smith | 395/550 |
| 4,330,826 | 5/1982 | Whiteside et al. | 395/550 |
| 4,490,050 | 12/1984 | Singhi | 368/46 |
| 4,564,903 | 1/1986 | Guyette et al. | 395/411 |
| 4,803,708 | 2/1989 | Momose | 377/28 |
| 5,146,585 | 9/1992 | Smith, III | 395/550 |

*Primary Examiner*—Thomas C. Lee
*Assistant Examiner*—Moustafa Mohamed Meky
*Attorney, Agent, or Firm*—William A. Kinnaman, Jr.

[57] ABSTRACT

An external time source is connected to a partitioned data processing system, having host processors controlled by a host hypervisor, and having operating systems in the partitions. The host processors each have a timer facility comprising a time-of-day (TOD) clock, and a clock comparator. When the hypervisor detects a need for synchronization between the external time source and a host timer facility, it insulates the operating system in the partition on that host from host synchronization, and synchronizes the host timer facility with the external time source. Subsequently, the operating system is placed into normal execution, with an adjustment value used for timer facility references, and with a synchronization interrupt pending if the operating system is aware of the external time source.

21 Claims, 30 Drawing Sheets

SYSTEM FOR SYNCHRONIZING LOGICAL CLOCK IN LOGICAL PARTITION OF HOST PROCESSOR WITH EXTERNAL TIME SOURCE BY COMBINING CLOCK ADJUSTMENT VALUE WITH SPECIFIC VALUE OF PARTITION

This is a continuation of application Ser. No. 07/754,815 filed on Sep. 4, 1991, now abandoned.

BACKGROUND OF THE INVENTION

1. Field of the Invention

This invention relates to computers and computer system complexes comprising a logically partitioned processor governed by a hypervisor. More particularly, this invention describes a mechanism for coordinating the synchronization between an external timer, connected to physical processors in the processor complex, and logical processors controlled by a hypervisor executing on the physical processors.

2. Background Art

CPU time-of-day (TOD) clocks are well known in the data processing field. A time-of-day clock provides a high-resolution measure of real time suitable for the indication of date and time of day. In an installation with more than one CPU, each CPU may have a separate TOD clock, or more than one CPU may share a clock, depending on the model. In all cases, each CPU has access to a single clock.

The TOD clock in an embodiment such as IBM's ESA/390 Systems is a binary counter. The bit positions of the clock are numbered 0 to 63, corresponding to the bit positions of a 64-bit unsigned binary integer.

In the basic form, the TOD clock is incremented by adding a one in bit position 51 every microsecond. In models having a higher or lower resolution, a different bit position is incremented at such a frequency that the rate of advancing the clock is the same as if a one were added in bit position 51 every microsecond. The resolution of the TOD clock is such that the incrementing rate is comparable to the instruction-execution rate of the model.

A TOD clock is said to be in a particular multiprocessing configuration (i.e., tightly coupled MP system) if at least one of the CPUs which shares that clock is in the configuration. Thus, it is possible for a single TOD clock to be in more than one configuration. Conversely, if all CPUs having access to a particular TOD clock have been removed from a particular configuration, then the TOD clock is no longer considered to be in that configuration.

When more than one TOD clock exists in the configuration, the stepping rates are synchronized such that all TOD clocks in the configuration are incremented at exactly the same rate.

When incrementing of the clock causes a carry to be propagated out of bit position 0, the carry is ignored, and counting continues from zero. The program is not alerted, and no interruption condition is generated as a result of the overflow.

The operation of the clock is not affected by any normal activity or event in the system. Incrementing of the clock does not depend on whether the wait-state bit of the PSW is one or whether the CPU is in the operating, load, stopped, or check-stop state. Its operation is not affected by CPU, initial-CPU, or clear resets or by initial program loading. Operation of the clock is also not affected by the setting of the rate control or by an initial-microprogram-loading operation. Depending on the model and the configuration, a TOD clock may or may not be powered independent of a CPU that accesses it.

In an installation with more than one CPU, each CPU may have a separate TOD clock, or more than one CPU may share a TOD clock, depending on the model. In all cases, each CPU has access to a single clock.

The TOD-clock-synchronization facility of IBM's ESA/370 systems, in conjunction with a clock-synchronization program, makes it possible to provide the effect of all CPUs in a tightly coupled multiprocessing configuration sharing a single TOD clock. The result is such that, to all programs storing the TOD-clock value, it appears that all CPUs in the configuration read the same TOD clock. The TOD-clock-synchronization facility provides these functions in such a way that even though the number of CPUs sharing a TOD clock is model-dependent, a single model-independent clock-synchronization routine can be written. The following functions are provided:

Synchronizing the stepping rates for all TOD clocks in the configuration. Thus, if all clocks are set to the same value, they stay in synchronism.

Comparing the rightmost 32 bits of each clock in the configuration. An unequal condition is signaled by an external interruption with the interruption code 1003 hex, indicating the TOD-clock-sync-check condition.

Setting a TOD clock to the stopped state.

Causing a stopped clock, with the TOD-clock-sync-control bit set to one, to start incrementing when bits 32–63 of any running clock in the configuration are incremented to zero. This permits the program to synchronize all clocks to any particular clock without requiring special operator action to select a "master clock" as the source of the clock-synchronization pulses.

In a logically partitioned processor, such as IBM's PR/SM-LPAR, a plurality of operating systems operate in logical partitions, with the partitions controlled by a hypervisor. Such an approach is described in U.S. Pat. No. 4,843,541, "Logical Resource Partitioning of a Data Processing System", by Bean, et al., assigned to the assignee of the present invention and incorporated by reference herein. In such an environment, each logical processor is typically provided with a logical TOD clock which is used as the target and source of set and store clock instructions, and is managed by the hypervisor.

An additional complexity is introduced in a loosely-coupled system configuration, which is to be kept in sync by an external timer source (such as IBM's Sysplex Timer Facility). Such an external timer is described in the following patent applications, which are assigned to the present assignee, and incorporated herein by reference: "Fault Tolerant Clock for Multicomputer Complex", Ser. No. 07/392,812, filed Aug. 11, 1989, by Appelbaum, et al., now U.S. Pat. No. 5,249,206 "External Time Reference With Dynamic Steering", Ser. No. 07/537,389, filed Jun. 12, 1990, by Moorman, et al. now U.S. Pat. No. 5,041,798. In this case, a mechanism is provided for synchronizing a plurality of physical processors with an external time source. This presents the need for a way of providing timer support, including synchronization, to one or more logical partitions (each having operating systems running), controlled by a hypervisor, when the partitions are physically running on one or more physical processors which may be synchronized with an external timer source.

It is therefore an object of the present invention to provide timer support for a logically partitioned DP system with physical (host) processors which may be synchronized with an external timer.

It is a further object of this invention to provide hypervisor support for logical partitions which contain operating systems which interact with and are aware of the existence of an external timer, while at the same time supporting logical partitioning containing systems which do not interact with and are not aware of the existence of an external timer, where both sets of logical partitions execute on a common set of physical processors.

SUMMARY OF THE INVENTION

Each logical partition has read-only access to a real External Timer facility. Logical partitions are not allowed to alter the physical configuration. The logical partitions are allowed to enable and disable for External Timer related interrupts and to "resynchronize" to the External Timer facility upon receiving External Timer related interrupts by setting their logical TOD clocks to the Sysplex Timer time. Actual resynchronization is performed by the host. The logical partitions are also able to disable their logical (host-driven) stepping ports and thus choose not to run in synchronization with the External Timer. The host state is not changed by any of these actions.

DESCRIPTION OF THE PREFERRED EMBODIMENT

Glossary of Terms

Figure 1:
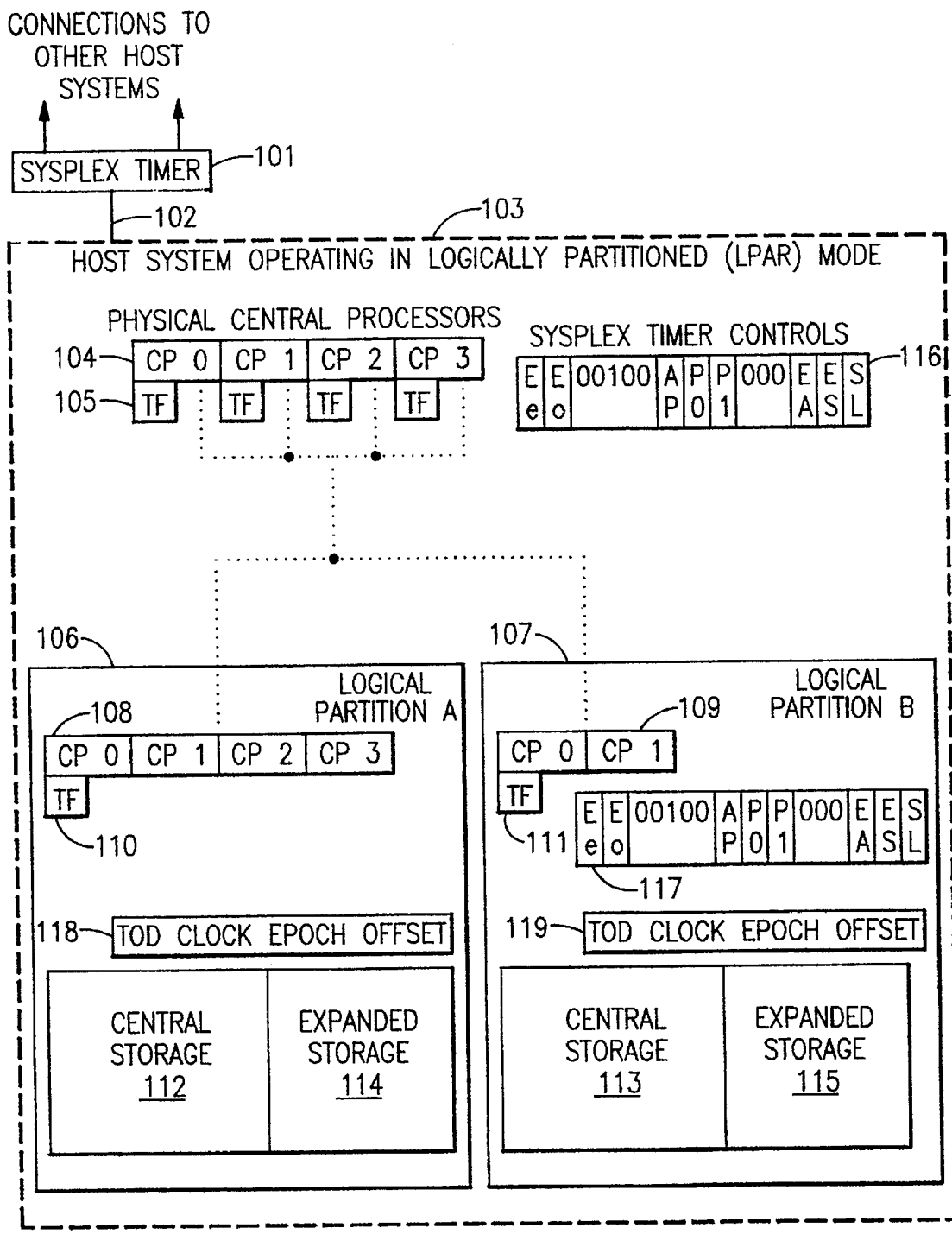
FIG. 1 is a System Block Diagram showing the major system elements in the present invention.

The following terms and acronyms are used in this application.

ATTDATA
  Sysplex Timer attachment information stored by the host into local host storage.

CKC
  Mnemonic for "clock comparator."

CPC
  Central Processing Complex.

Creep mode
  Creep mode refers to the fact that during a Sysplex Timer resynchronization the difference between successive values returned by requests for the value of the TOD clock is a very small positive value. The TOD clock appears to be "creeping" forward. This procedure is used to prevent using the actual TOD clock during a Sysplex Timer resynchronization since the value of the TOD clocks is in transit. This procedure also satisfies the requirement that the TOD clock always be moving forward.

Creep flag
A bit in the maximum TOD value corresponding to an unused bit in the TOD clock which is always stored as zero by STCK. It it set to one to indicate that creep mode is in effect.

DELTA
The amount of time to be subtracted from all partition TOD clock epoch offsets as the result resynchronizing to the Sysplex Timer. This value may be stated as formula:

(TOD_FINAL−TOD_INITIAL)−(CPU_TIMER_INITIAL−CPU_TIMER_FINAL)

where the first term is the difference between the TOD clock values on the CPU on which the host is performing the Sysplex Timer resynchronization and the second term is the difference between the CPU timers on the CPU on which the host is performing the Sysplex Timer resynchronization.

DIF
The difference between the old epoch offset and the new epoch offset.

Epoch offset
The difference between logical partition time and host time.

ETR
External Time Reference—synonym for Sysplex Timer.

Host
In this document "host" may be considered the equivalent of the PR/SM LPAR hypervisor but "host" may be any hypervisor which uses the PR/SM hardware feature.

NEGEPOCH
The negative Epoch offset.

NEW_MAX
New maximum value of TOD.

OLD_MAX
Former maximum value of TOD.

OTE
On Time Event. An on-time event occurs when a carry out into bit position 31 of the TOD clock occurs, that is, when the rightmost 32 bits of the TOD clock increment to zero. The "next OTE" value may be obtained by adding one to the leftmost 32-bit word of a TOD-clock value and setting the rightmost 32-bit word to zero.

SCK
Set Clock instruction mnemonic.

SCK_Active
Condition where the partition has set its TOD clock override control bit (CR0.2) to 1 and the low order word of its TOD to 0 and has issued the SCK instruction in an attempt to synchronize its logical TOD with the Sysplex Timer at the next On Time Event.

SCK_OTE_TIME
The time that a partition's TOD clock will start after having issued SCK provided control register 0 bit 2 is on, i.e. at the next partition on-time event.

SCKC
Set Clock Comparator instruction mnemonic.

STCK
Store Clock instruction mnemonic.

STCKC
Store Clock Comparator instruction mnemonic.

STETR
The process of storing ETR attachment information.

Sync check
A condition that generates either a machine check or an external interruption and occurs when the difference either between TOD clocks on different physical CPUs or the difference between a CPU TOD clock, either physical or logical, and the Sysplex Timer time is not within a machine-dependent tolerance.

Sync Check Mask
Bit Mask used to determine which TOD clocks in a given CPC have received a sync check. Once the sync check has been processed by the hypervisor, the bit mask is cleared.

TF
CPU timing facilities, including a time-of-day clock and a clock comparator.

TOD
Time-Of-Day.

TODW0(CVTOD)
Word 0 of the host TOD value returned by the routine CVTOD.

FIG. 1 shows a block diagram of a portion of a system complex composed of a multiplicity of host systems. FIG. 1 shows a Sysplex Timer 101 connected to a particular host system operating in logically-partitioned (LPAR) mode 103. This host system 103 contains four physical central processors 104, each of which has an associated set of timing facilities (TF) 105, which includes a time-of-day (TOD) clock and a clock comparator. Host system 103 also has Sysplex Timer controls 116. The Sysplex Timer controls include the following:

| | |
|---|---|
| Ee | Stepping enablement for the even Sysplex Timer port. |
| Eo | Stepping enablement for the odd Sysplex Timer port. |
| Ap | Alternate data port enablement. |
| P0 | Port Availability Change interrupt enablement for the even Sysplex Timer port. |
| P1 | Port Availability Change interrupt enablement for the odd Sysplex Timer port. |
| EA | Sysplex Timer Alert interrupt enablement. |
| ES | Sysplex Timer Sync Check interrupt enablement. |
| SL | Sysplex Timer Switch-To-Local interrupt enablement. |

This host system 103 has two logical partitions 106, 107. Logical partition A 106 has four logical central processors 108 while logical partition B 107 has two logical central processors 109. Each of the logical processors has access to a single set of associated timing facilities (TF) 110, 111 which include a logical TOD clock and a logical clock comparator. Each logical partition is also provided with a TOD clock epoch offset 118, 119 that contains the difference between the host TOD clock 105 value and the logical partition TOD clock 110, 111 values. Logical partition B is provided with simulated Sysplex Timer controls 117, while logical partition A is not.

Each logical partition further has its own portion of central storage 112, 113 and expanded storage 114, 115 for program and data storage. Not shown in FIG. 1 are the (conventional) attached I/O data channels, I/O control units, and I/O devices.

The Sysplex Timer controls provide those functions required to select the stepping port and the data port. They also provide the capability to mask certain Sysplex Timer external interruption and external-damage machine-check conditions.

Each CPU in the host system has the ability to set the Sysplex Timer attachment controls and to store Sysplex Timer attachment information.

The Stepping-Port controls (Ee and Eo) of the Sysplex Timer controls 116 control the selection of even and odd ports, respectively, of the current port group to be the stepping port. If a bit is one, selection of the associated port to be the current stepping port is enabled; otherwise, selection of the port is disabled. If both bits 0 and 1 are zeros, the host operates in the local-stepping mode.

When the Sysplex Timer facility 101 is installed and the host is operating in LPAR mode 103, manipulation of the Sysplex Timer facility 101 and Sysplex Timer controls 116 is restricted to the host. This activity is transparent to logical partitions 106, 107 that are using the Sysplex Timer facility.

Logical partitions that are capable of operating in Sysplex Timer mode, such as logical partition B 107, are provided with simulated Sysplex Timer controls 117. Such logical partitions are provided read-only access to the Sysplex Timer. Each of these logical partitions may store simulated Sysplex Timer attachment information. Each of these logical partitions may also manipulate its own simulated Sysplex Timer controls 117.

The host determines at IPL time if a set of Sysplex Timer controls exists on the CPC. If a set of Sysplex Timer controls exists and if the Sysplex Timer itself is operational, the host determines the Sysplex Timer time at the next on-time event (an on-time event occurs when a carry out into bit position 31 of the TOD clock occurs, that is, when the rightmost 32 bits of the TOD clock increment to zero) and synchronizes all physical TOD clocks to the Sysplex Timer by setting them to the on-time event value. If the Sysplex Timer is not available at IPL time but becomes available at some point after the IPL, the host establishes synchronization to the Sysplex Timer in a similar manner at that later time.

A given CPC may have the Primary Clock Synchronization Facility (known in prior art) installed. When the Primary Clock Synchronization Facility is installed, it is possible to designate one of the TOD clocks in the CPC as the "Primary" TOD clock. All other TOD clocks in the CPC then become "secondary" TOD clocks. If, at IPL time, the host determines that controls exist to select a Primary TOD, it will select one TOD to be the "Primary" TOD and will therefore operate in "Primary Synchronization" mode.

The host operates in "primary Sysplex Timer mode" wherein the primary TOD clock is synchronized to the Sysplex Timer, and the non-primary TOD clocks are synchronized to the primary TOD clock with TOD-sync checks enabled. In primary Sysplex Timer mode, a TOD-sync check is reported when a non-primary TOD clock is out of sync with the primary TOD clock and a Sysplex Timer-sync check is reported when the primary TOD clock is out of sync with the Sysplex Timer.

An LPAR partition is said to be in "Sysplex Timer mode" if the host is currently in primary Sysplex Timer mode, and the logical partition has enabled the host's current Sysplex Timer stepping port (Ee or Eo) in the logical partition's simulated Sysplex Timer Controls 117.

The logical partition has read-only access to the real Sysplex Timer facility. Logical partitions are not allowed to alter the physical configuration. The logical partition is allowed to enable and disable for Sysplex Timer-related interruptions and to "resynchronize" to the Sysplex Timer facility upon receiving Sysplex Timer-related interruptions by setting its logical TOD clock to the Sysplex Timer time. Actual resynchronization is performed by the host. The logical partition can also disable its logical (host-driven) stepping ports and thus choose not to run in Sysplex Timer mode. The host state is not changed by any of these actions.

There are several clear-cut distinctions between operating in the basic mode of the machine and operating in LPAR mode.

Logical partitions cannot alter the physical Sysplex Timer configuration by manipulating Sysplex Timer controls. If the logical partition alters its Sysplex Timer controls, only its own enablement for interruptions is affected. Logical partitions cannot choose a stepping port. All logical partitions must choose to synchronize to the host's current stepping port or they are placed in local mode by the hypervisor.

All Sysplex Timer-related interruptions are broadcast to all logical processors of all logical partitions that have enabled for the interruptions in their Sysplex Timer controls. "Ancillary report" bits are used for machine checks so that only one "log" entry is created for every actual incident.

All logical partitions that are operating in Sysplex Timer mode and are enabled for switch-to-local machine checks in their Sysplex Timer controls will receive a switch-to-local machine check if the host loses synchronization with the Sysplex Timer. When the host loses synchronization with the Sysplex Timer facility, then the Sysplex Timer facility cannot be used either by the host or any logical partition unless the host can reestablish synchronization with the Sysplex Timer facility.

If a logical partition attempts to set its TOD clock to a value that has a nonzero second word it will receive a Sysplex Timer sync check at the next on-time event. The logical partition will receive a switch-to-local external-damage machine check if it disables the host's current stepping port.

A logical partition in local mode may enter Sysplex Timer mode provided that the host is synchronized to the Sysplex Timer and the logical partition is enabled for Sysplex Timer and is enabled for the host current stepping port. The logical partition will receive a Sysplex Timer sync check at the next on-time event if its TOD clock does not have a zero second word when it enters Sysplex Timer mode. Each LPAR logical partition has a single logical TOD clock that is shared by all of its logical CPUs and that can be synchronized with the Sysplex Timer. This logical TOD clock is required to be in one of the following states:

0
No "TOD clock operation" in progress.
1
TOD calculation in progress.
2
SCK in progress, logical partition offset from host time not yet determined.
3
SCK in progress with logical partition offset from host time determined.
4
SCK in progress with logical partition offset from host time being broadcast.
5
Host sync check handling in progress with logical partition offset from old host time not yet determined.
6
Host sync check handling in progress with logical partition offset from old host time set.
7
Host sync check handling in progress with logical partition offset from old host time set and a logical partition TOD calculation is in progress.
8
Host sync check handling in progress with logical

| | |
|---|---|
| partition offset from old host time not yet determined plus SCK in progress with logical partition offset from host time determined. 9 | |
| Host sync check handling in progress with logical partition offset from old host time set plus SCK in progress with logical partition offset from host time determined. 10 | |
| Host sync check handling in progress with logical partition offset from host time being broadcast. 11 | |
| Host sync check handling in progress with logical partition offset from old host time set plus SCK in progress with logical partition offset from host time being broadcast. 12 | |
| Host sync check handling in progress with logical partition offset from host time being broadcast plus SCK in progress with logical partition offset from host time determined. | |

These states ensure the integrity of the logical TOD clock for all interactions with operations that may have an impact on the logical TOD clock.

Figure 2:
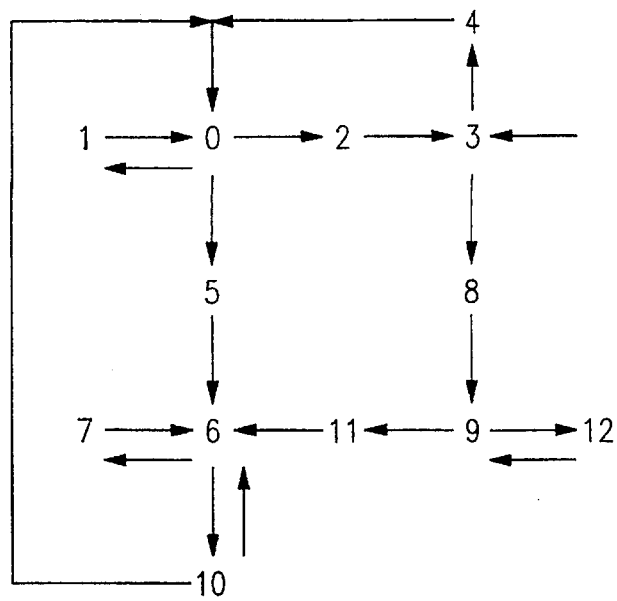
FIG. 2 is a state change diagram illustrating possible changes in TOD Clock State in a logical partition.

Allowed transitions between TOD clock states are shown schematically in FIG. 2. When more than one logical partition task is capable of changing the state at a given time, an interlocked update such as compare-and-swap is used to perform transitions from one state to the next.

Figure 5:
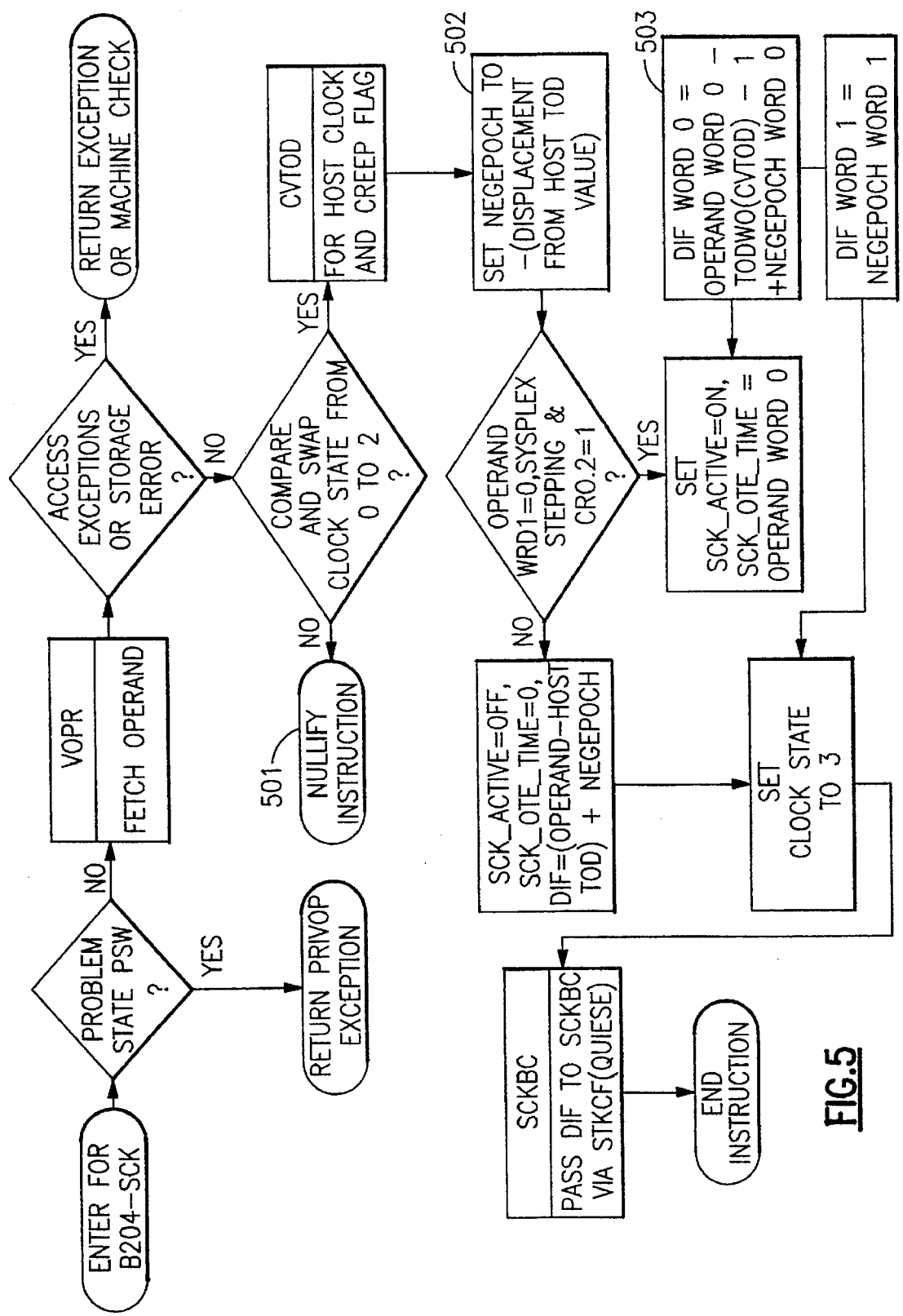
FIG. 5 is a flowchart illustrating execution of SET CLOCK instructions in the present invention.

Handling of SCK when the logical partition is in Sysplex Timer mode (See FIG. 5):

1. States 2, 3 and 4 are "SCK-only", i.e. the only function in progress is the setting of the logical partition TOD. In states 8, 9, 11 and 12, host sync check handling occurs simultaneously with SCK simulation. The normal progression of states when no host sync check is present is

0–2–3–4–0.

2. Partition SCKs can only be initiated if no host sync check handling or logical partition TOD calculation is being performed. The host must always simulate this instruction (See FIG. 5) on behalf of a logical partition. The instruction is nullified 501 if the logical partition is not in state 0 upon entering SCK simulation. It is possible for host sync check handling to begin during SCK simulation. Therefore SCK simulation must make sure that the logical partition offset from host time is not being altered by host sync check handling before updating logical partition offset from host time. The progression of states in this case is:

8–9–12–9–12–3–4–0

3. The host sync check handler is also forced to wait to update the logical partition offset from host time If the SCK simulation is also updating the logical partition offset from host time. The sequence of states in this case is as follows:

8–9–11–6–10–6–10–0

4. Since host sync check handling may begin during SCK simulation, the host sync check handler must wait until the DELTA that is going to be added to the logical partition offset from host time has been determined by SCK simulation 502–503 before proceeding, i.e. the sync check handler waits until it can move from state 3 to 8. This is no problem since state 2 is transitory.

Figure 6:
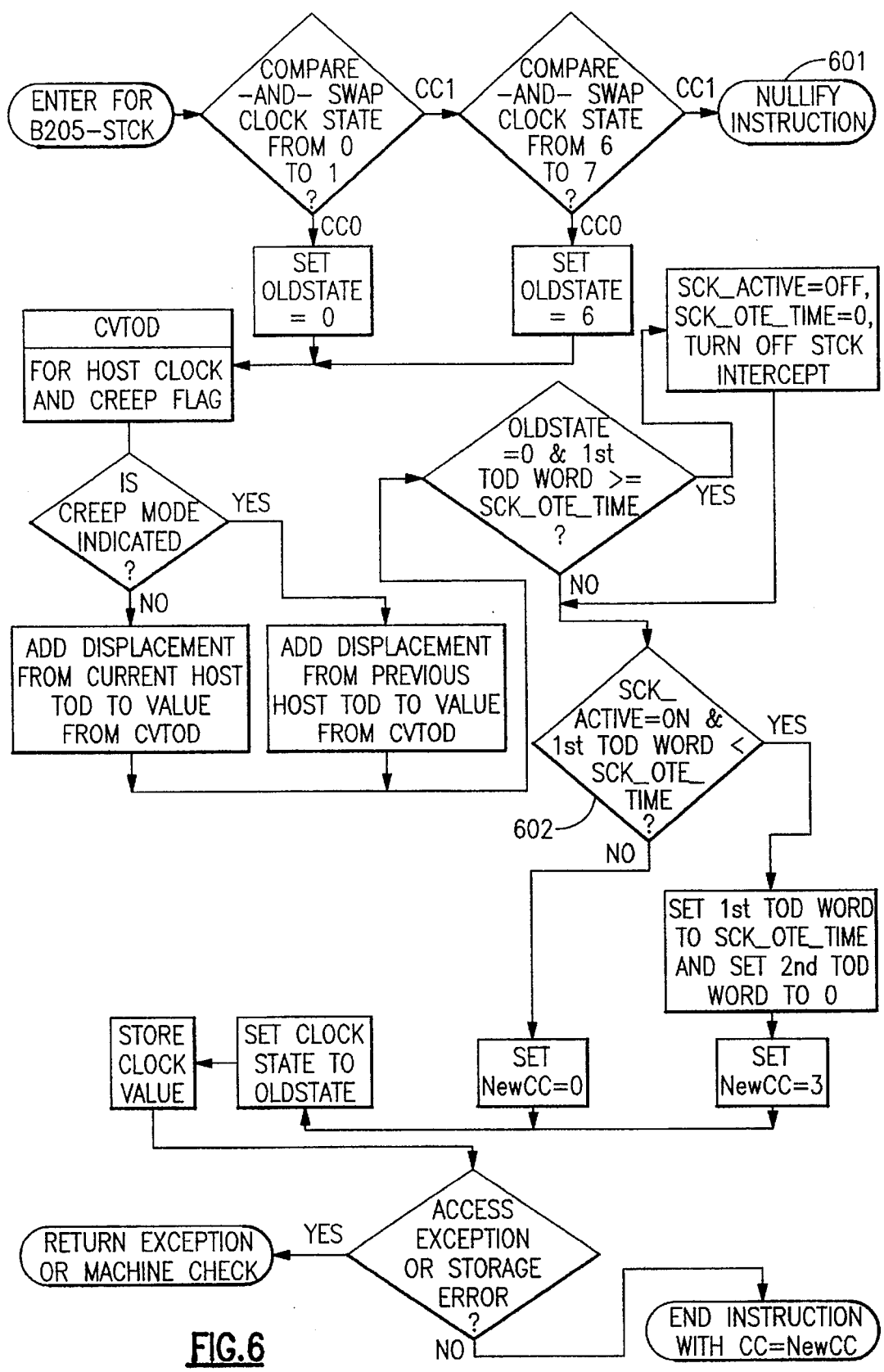
FIG. 6 is a flowchart illustrating execution of intercepted STORE CLOCK instructions in the present invention.

Handling of STCK when the logical partition is in Sysplex Timer mode (See FIG. 6):

1. State 1 is a "logical partition-TOD-calculation-only" state. The host needs to simulate a logical partition STCK instruction only while the host is in the process of resynchronizing its CPU TODs with the Sysplex Timer (See FIG. 6). STCK can only be performed from states in which no logical partition SCK is active 602 and no logical partition offset from host time broadcast is being performed. This leaves only states 0 and 6. (State 5 is transitory). Otherwise the instruction is nullified 601. The same rule applies to any other instruction simulation that requires knowledge of logical partition offset from host time. The normal state sequence is

0–1–0 or

6–7–6

2. Since host sync check handling may begin during a logical partition TOD calculation, any update of logical partition offset from old host time or logical partition offset from host time must wait until the calculation is completed. Hence the host check handler can not begin if the logical partition is in state 1, and broadcast of logical partition offset from host time cannot begin if the logical partition is in state 7.

Interactions with host physical TOD clock synchronization:

Interactions are described above. States 5, 6 and 10 are "host-sync-check-handling-only". If no SCK or logical partition TOD calculations are being done, there is no interference and the normal state sequence is

0–5–6–10–6–10–0.

Resynchronization of CPU TOD clocks with the Sysplex Timer is performed under several circumstances:

The most obvious case is that a resynchronization must be performed if a sync check has occurred.

If the host is currently not synchronized to the Sysplex Timer and an interruption indicating that the Sysplex Timer is operational is received, then the host will establish synchronization with the Sysplex Timer.

If the host is currently not synchronized to the Sysplex Timer but determines during the course of logical-partition Sysplex-Timer-instruction simulation that the Timer is now available, the host will reestablish synchronization with the Sysplex Timer.

When the Sysplex Timer attachment feature is installed, the host runs in the "primary Sysplex Timer mode." In this mode, one CPU TOD clock is designated as the "primary TOD clock." Only this TOD clock is synchronized to the Sysplex Timer; all other CPU TOD clocks are synchronized to the primary TOD clock. If a resynchronization is to be performed, the host determines what the Sysplex Timer time will be at the next "on-time" event and sets all TOD clocks to that value. The next on-time event will cause the TOD clocks to start. The Sysplex Timer is the source of the on-time event for the primary TOD clock. For the other CPUs, the source of the on-time event is the carry out of bit 32 of the primary TOD clock.

Figure 3:
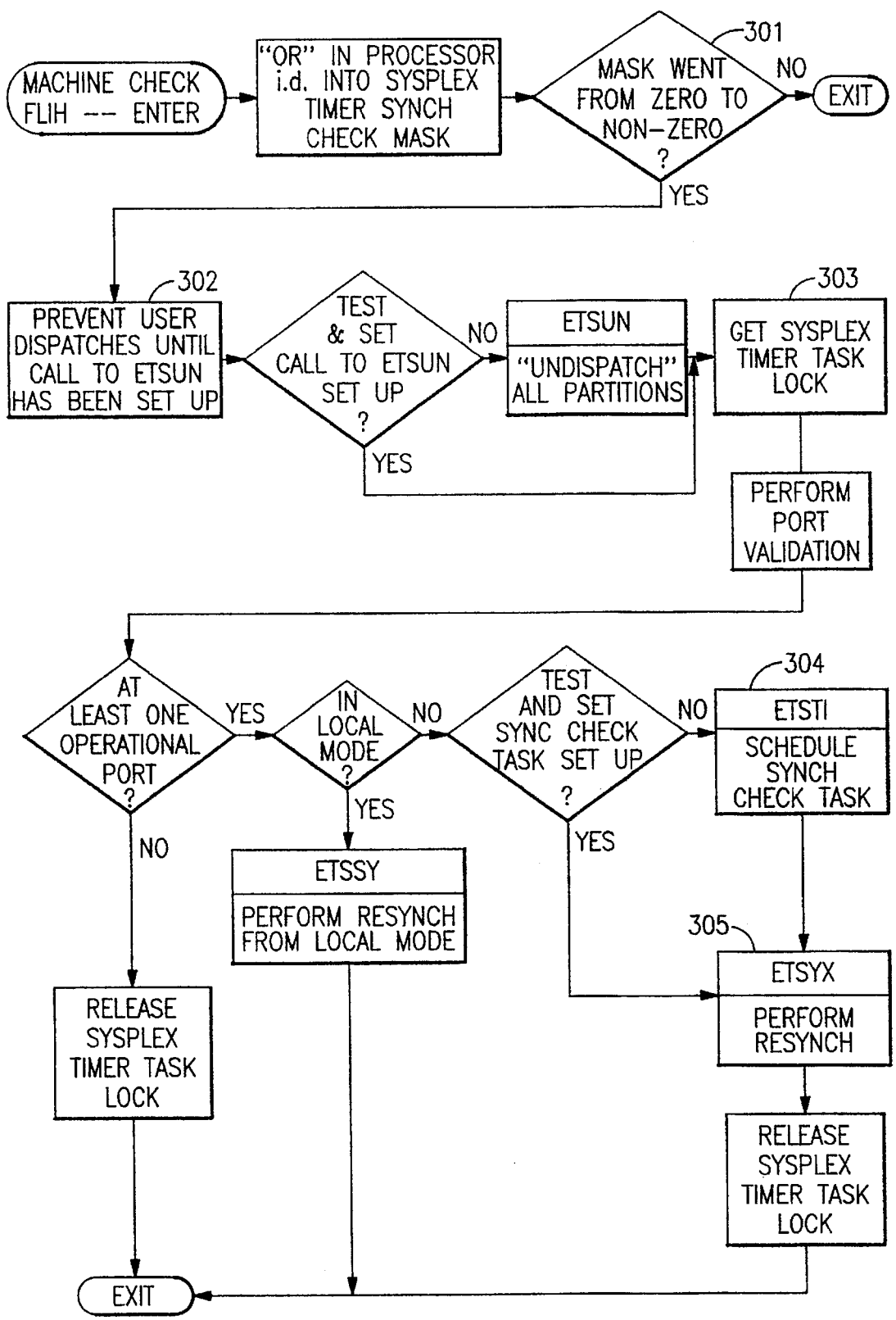
FIG. 3 is a flowchart illustrating Sysplex Timer sync check processing.

FIG. 3 shows a flowchart of the processing of a Sysplex Timer sync check. When a processor gets a sync check, it turns on a processor-specific flag in a Sysplex Timer sync check mask. If this mask has changed from all zeros to nonzero 301, then the host machine check handler will direct the dispatcher to accept only system work 302–303 until the host can call the main synchronization module ETSYX 304.

Figure 4:
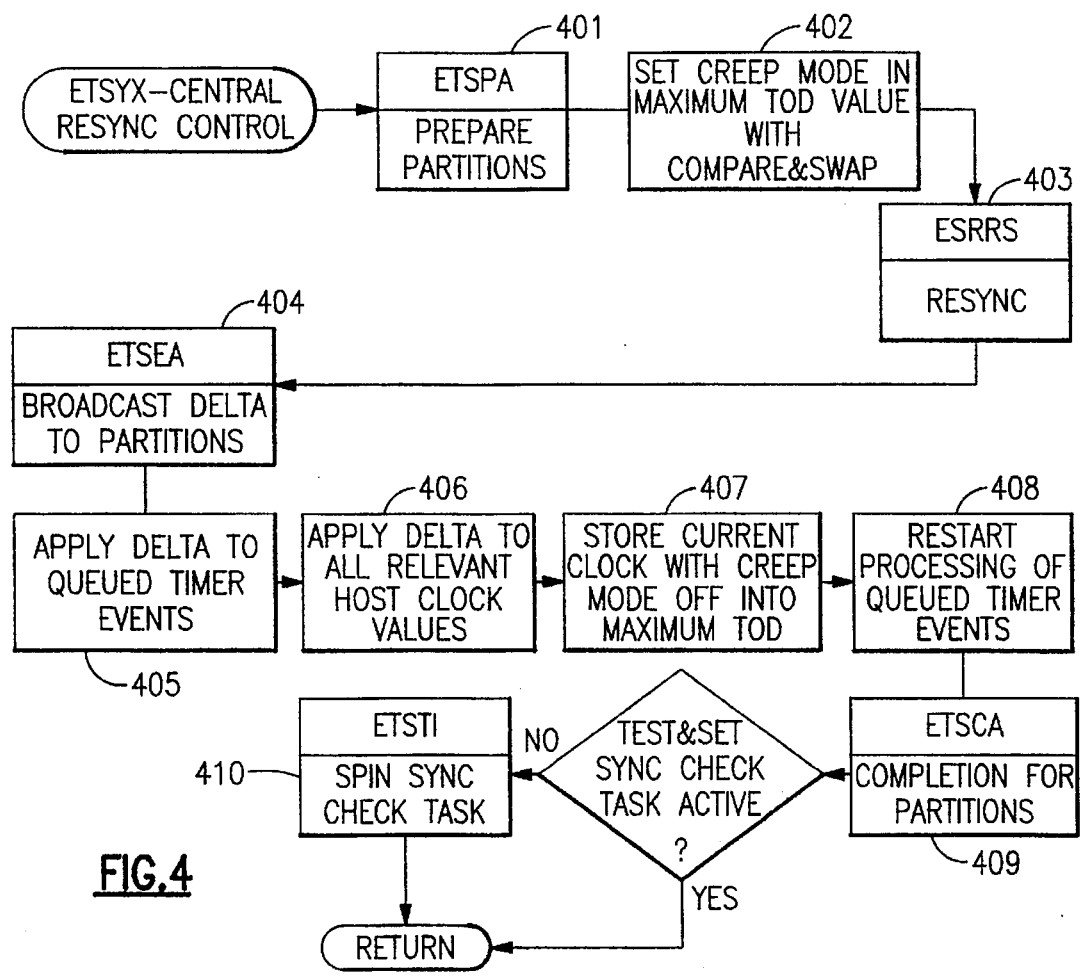
FIG. 4 is a flowchart illustrating Central Resynchronization Control.

The main synchronization module ETSYX (described in more detail in FIG. 4) is called from the machine check SLIH 305. The host machine check handler first prevents all logical partitions from entering their instruction streams during synchronization 302–303 and then re-enables system tasks. The Sync Check Task is scheduled 304 so that the Sysplex Timer mode logical partitions will have a sync check pending before executing any further instructions.

ETSYX (See FIG. 4) begins 401 by causing the host to get control whenever a logical partition issues STCK, SCKC and STCKC. The current value of logical CPU clock comparator is saved and the maximum possible value is placed in the logical partition state descriptor to prevent clock comparator interruptions from occurring during synchronization.

Since the TOD clocks on the processors can move backwards or stop for long periods of time during resynchronization, the host enters "creep mode" at this point 402 by setting bit 60 of the current maximum time value (TODMAX) to one. This bit is stored as zero in the prior art when a STCK instruction is performed. In creep mode, requests for the current time (calls to GETTOD) will not receive the true time. The value of TODMAX (current maximum time observed) is increased by a very small amount and passed back to the caller. The TOD clock appears to be "creeping" forward, which satisfies the architectural requirement that the TOD clock value always increase.

At this point 403, all host TOD clocks are set to the Sysplex Timer time as follows. The Sysplex Timer time at the next on-time event is determined. This time is saved in a common area and the host directs all processors to execute code that will set the TOD clock to this value. If the TOD clocks are all set before the next on-time event occurs, then the resynchronization will be successful. If not, this sequence is repeated until all TOD clocks are successfully set. The host will then loop until the TOD clock starts and then compute the amount by which the TOD clock has moved forward or back (DELTA) and to broadcast that value to all logical partitions 404.

The actual resynchronization is now complete. The TOD offset created by the sync check (DELTA) is now subtracted from logical partition offset from host time (the epoch offset) for all logical CPUs in all valid logical partitions and added to all time expiration values for all queued host tasks 405, 406.

"Creep mode" is now ended 407 and the new TOD clock value is placed in TODMAX simultaneously since these two items are in the same double word. This is done to prevent a time gap between when "creep mode" is ended and the new value of TODMAX is installed. TODMAX is maintained as an additional check that all subsequent STCK values monotonically increase. Clock comparators are restored to their previous values from the previously saved value 408.

The host Sysplex Timer sync check is now broadcast to all logical partitions operating in Sysplex Timer mode that have disabled the host's current stepping port or have nonzero values for the logical partition offset from host time 409. The sync check must be made pending before any further instructions are executed by any Sysplex Timer mode logical partition.

A task to generate Sysplex Timer sync checks is scheduled 410 for one binary second (2**20 microseconds=1, 048,576 microseconds) from now since these sync checks occur at intervals of one binary second until the condition that causes the sync check is cleared. When this task is executed, it will broadcast Sysplex Timer sync checks to all logical partitions operating in Sysplex Timer mode that have disabled the host's current stepping port or have nonzero values for the logical partition offset from host time. It will then reschedule the task to run one binary second from the current time if any logical partition operating in Sysplex Timer mode is found that either had disabled the host stepping port or has a nonzero logical partition offset from host time.

All logical partition saved values of logical CPU clock comparator are now restored. STCK, SCKC and STCKC instructions no longer need to be simulated by the host.

DESCRIPTION OF LOW-LEVEL RESYNCHRONIZATION FLOWCHARTS

Figure 8:
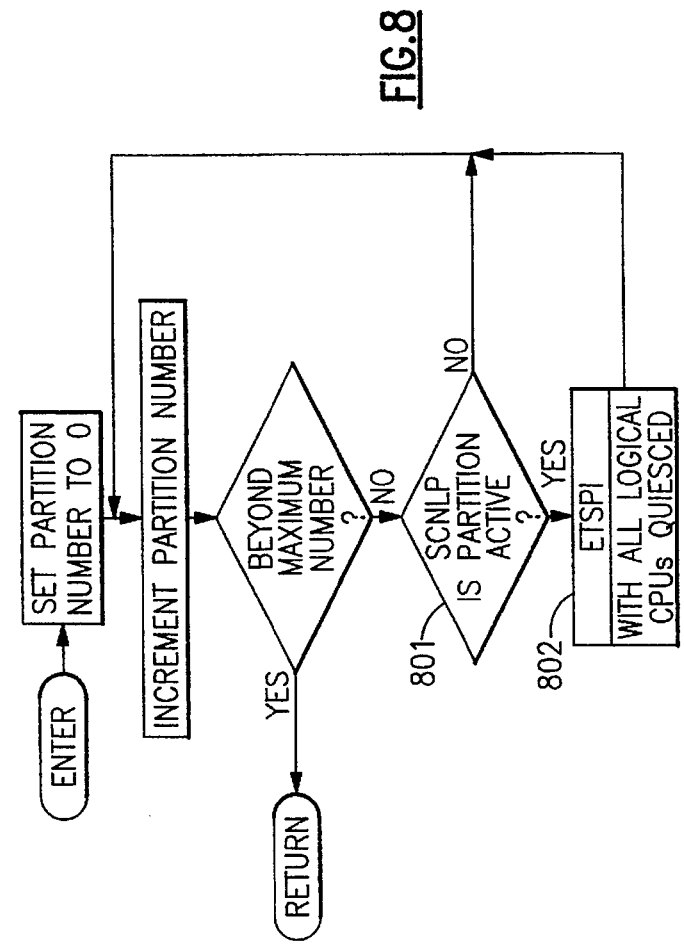
FIG. 8 is a flowchart showing the preparation of active partitions for resynchronization.
Figure 9:
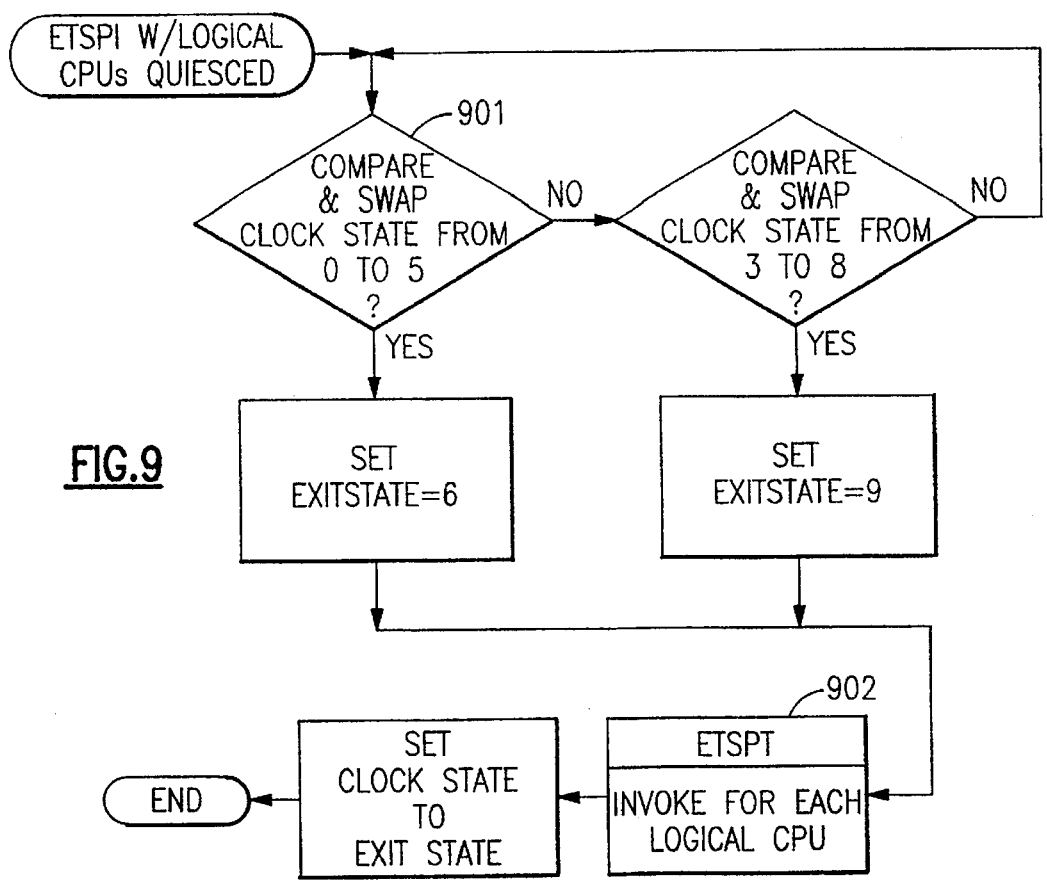
FIG. 9 is a flowchart showing the preparation of a logical partition for a host resynchronization to the Sysplex Timer.
Figure 10:
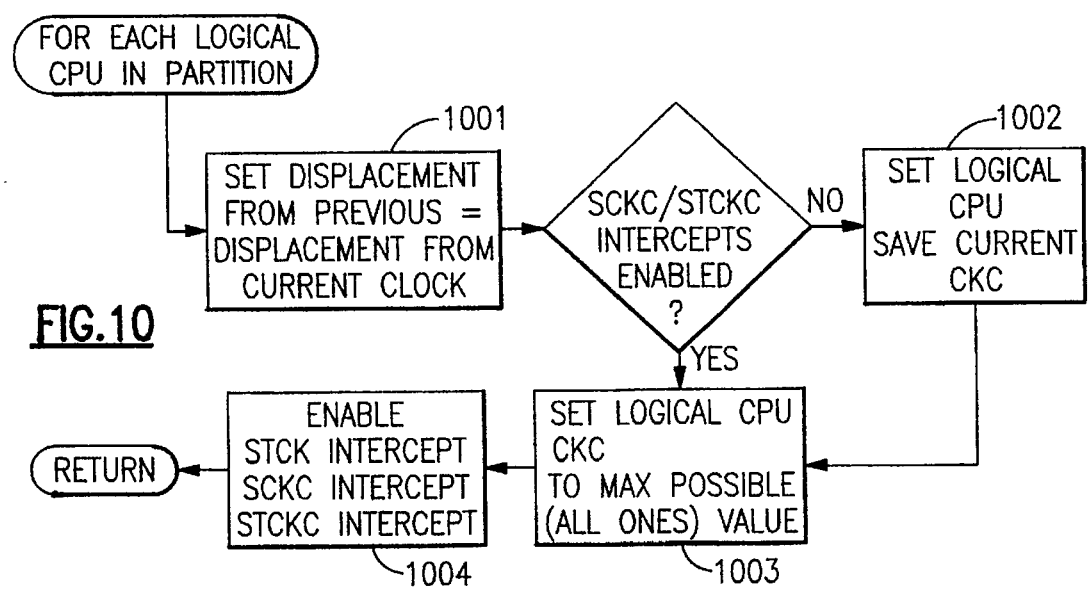
FIG. 10 is a flowchart showing processing for each logical CPU when preparing a partition resynchronization.

ETSPA (FIG. 8, invoked at step 401 in FIG. 4) prepares the logical partitions by selecting the active logical partitions, quiescing their logical CPUs 801, and calling ETSPI 802. ETSPI (FIG. 9) sets the logical partition's logical TOD clock state to reflect a host sync-check handling in progress 901 and calls ETSPT 902. ETSPT (FIG. 10) saves the logical partition's epoch-offset value 1001 and logical-clock-comparator value 1002; sets the logical clock comparator to the maximum possible value so that clock comparator interruptions will not occur during the resynchronization process 1003; and sets up for STCK, SCKC, and STCKC interception to occur if they are executed during the resynchronization process 1004.

Figure 11:
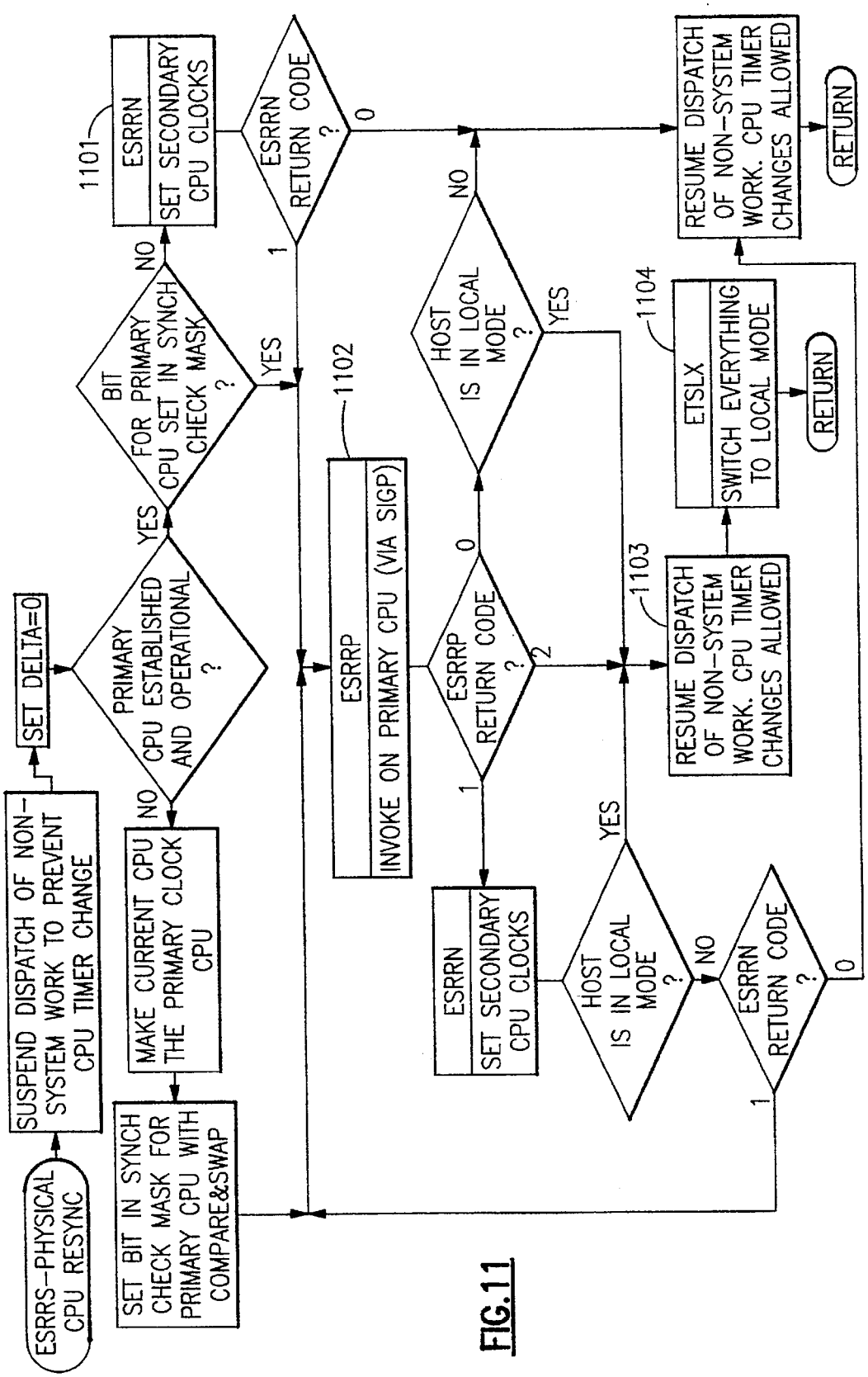
FIG. 11 is a flowchart showing the resynchronization of physical CPU clocks in the present invention.
Figure 12:
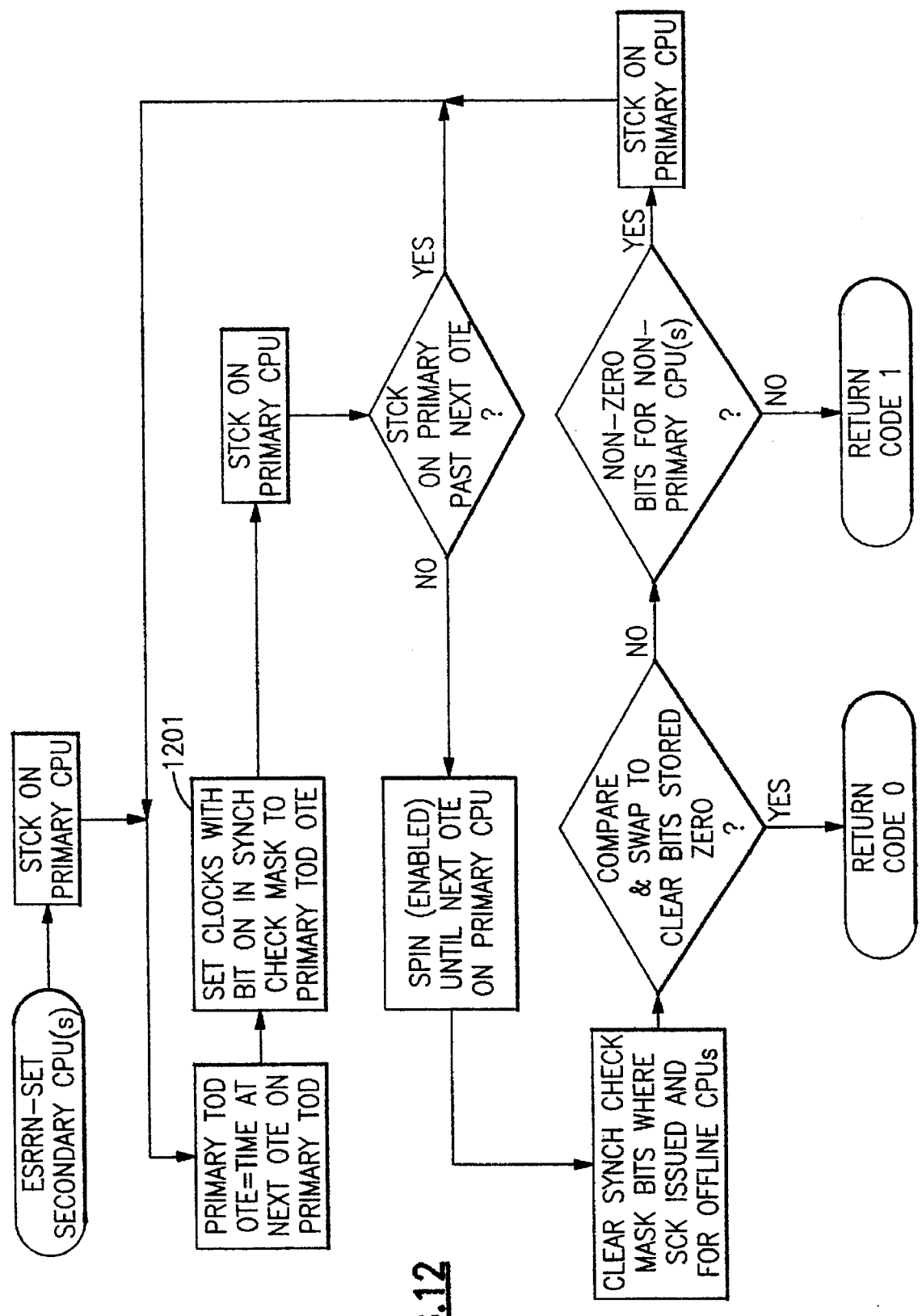
FIG. 12 is a flowchart showing the resynchronization of secondary CPU clocks in the present invention.
Figure 13:
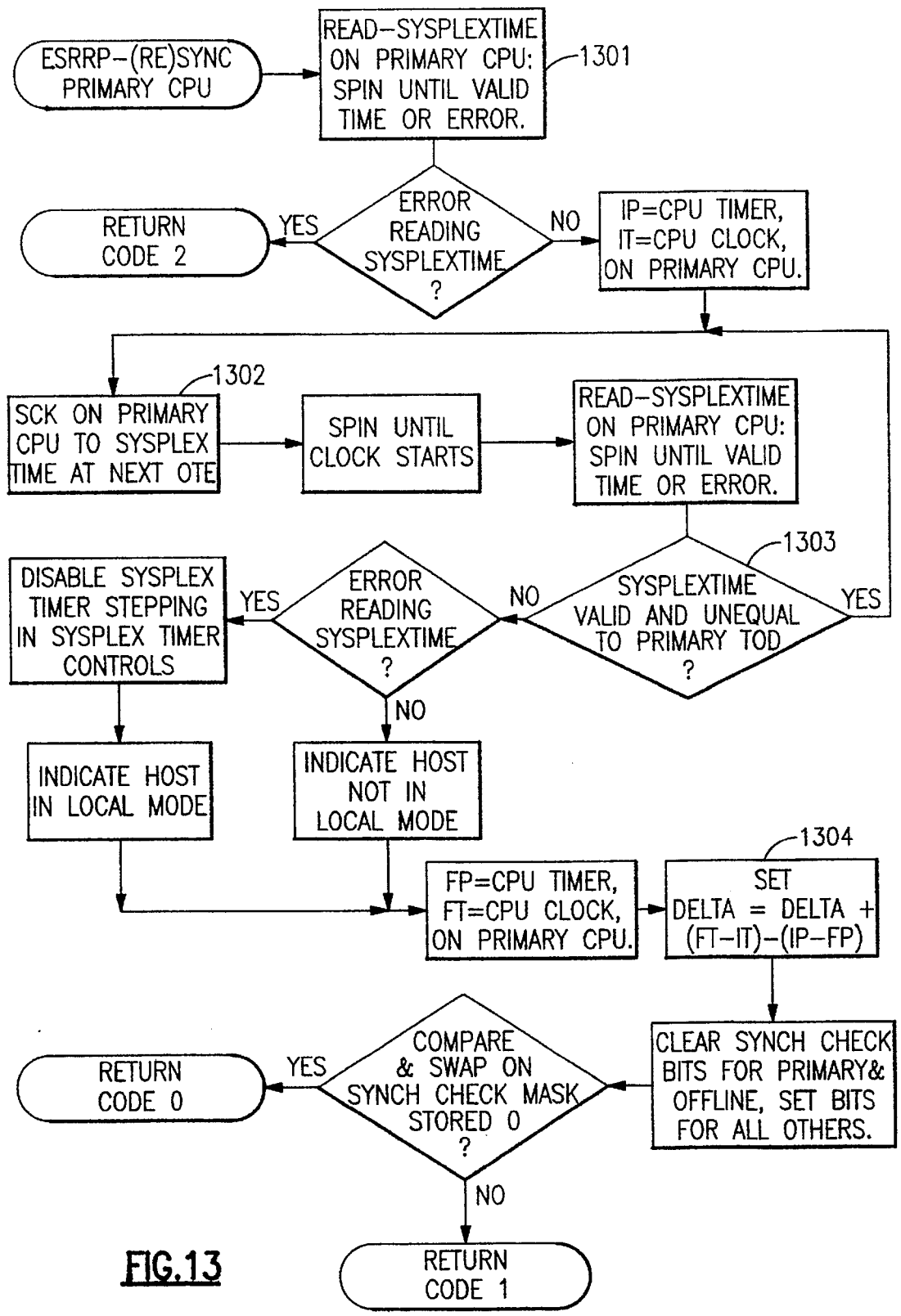
FIG. 13 is a flowchart showing the resynchronization of the primary CPU clock in the present invention.

ESRRS (FIG. 11) performs the resynchronization of the physical CPU TOD clocks by calling ESRRN 1101 to set the secondary TOD clocks and ESRRP 1102 to set the primary TOD clock. Those skilled in the art will observe that hardware allowing all CPU clocks to be stepped by the external time reference will allow resynchronization of the host clocks to be completed by such a process, usually within slightly more than one second from the time at which the need for resynchronization was determined. ESRRN (FIG. 12) sets all secondary TOD clocks to the same value as the primary TOD clock 1201. Those skilled in the art will observe that by setting all secondary clocks from the primary clock in parallel, resynchronization of the host clocks will usually be completed within slightly more than two seconds from the time at which the need for resynchronization was determined. ESRRP (FIG. 13) reads the time from the Sysplex Timer 1301 and sets the primary TOD clock to the next on-time event 1302. When the primary TOD clock has been successfully set 1303, ESRRP computes the difference between the old and new primary TOD clock values and subtracts the difference between old and new CPU Timer values and stores the result in DELTA 1304. After the physical TOD clocks have been successfully set, ESRRS resumes dispatching logical partitions 1103 and calls ETSLX to switch all TOD clocks to local mode synchronization 1104.

Figure 14:
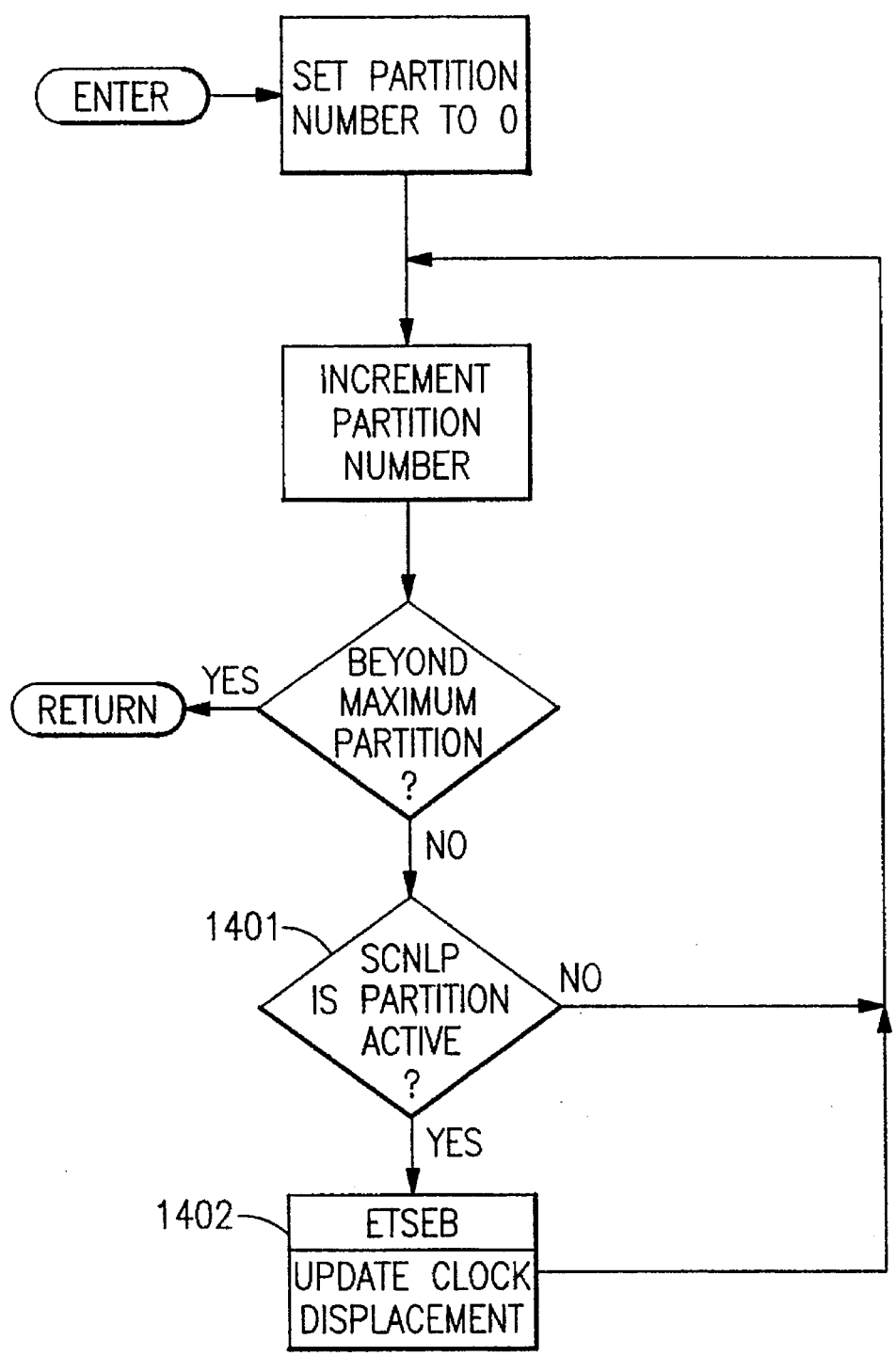
FIG. 14 is a flowchart showing the application of a DELTA to active partitions.
Figure 15:
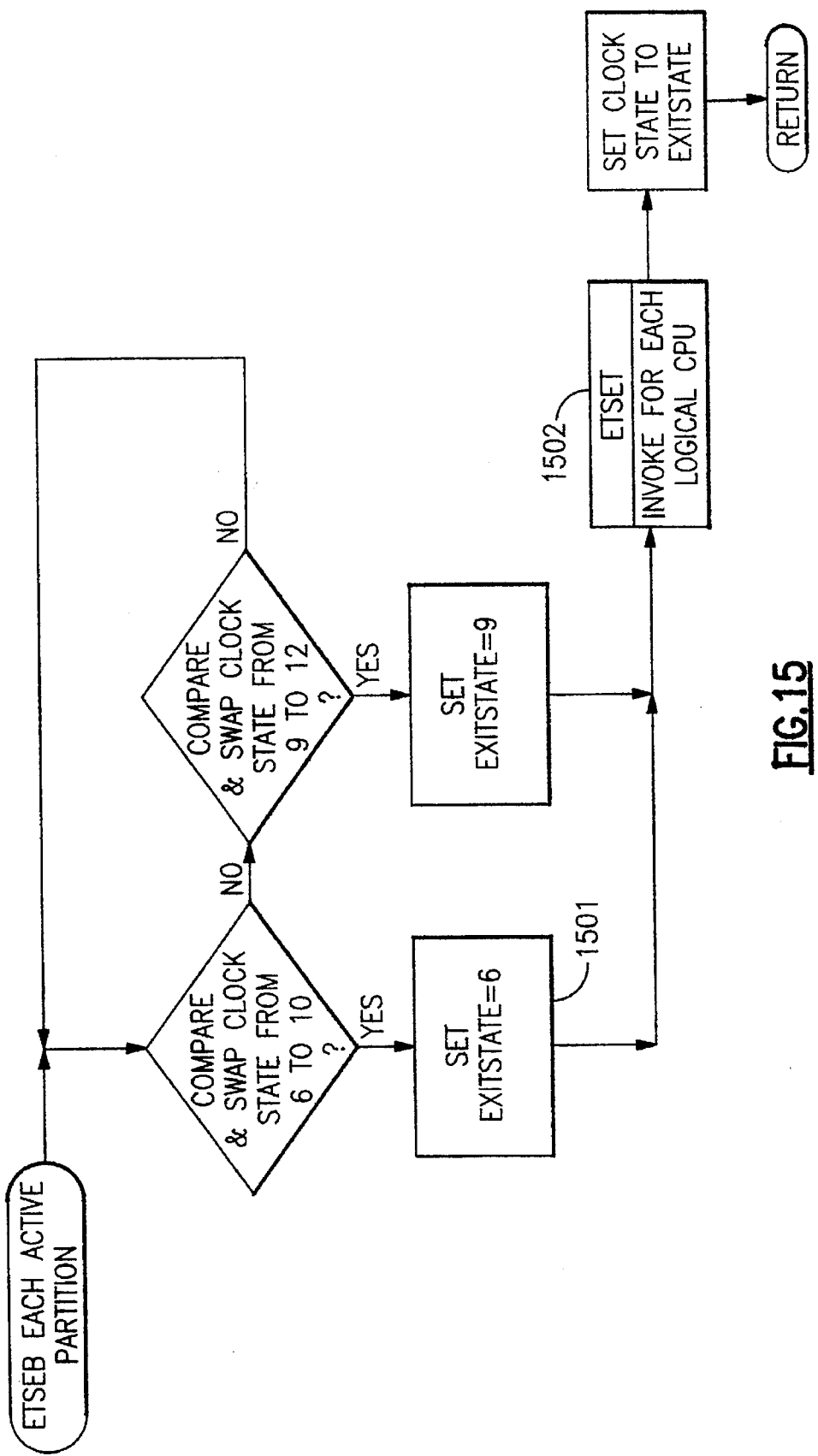
FIG. 15 is a flowchart showing the updating of the displacement from current host clock after host resynchronization.
Figure 16:
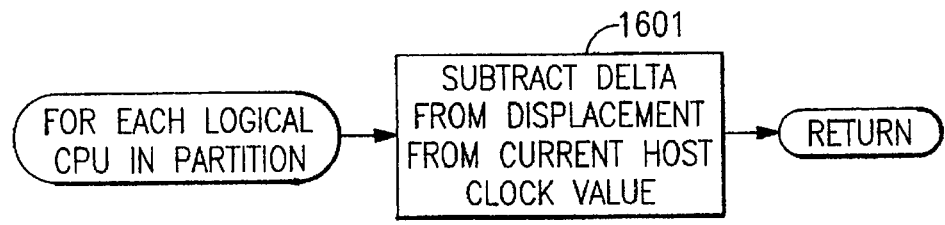
FIG. 16 is a flowchart showing the updating of the displacement from current host after resynchronization, for each logical CPU.

ETSEA (FIG. 14) applies DELTA to all active logical partitions by selecting each one 1401 and calling ETSEB 1402. ETSEB (FIG. 15) sets up the TOD clock state to exit sync-check handling 1501 and calls ETSET 1502. ETSET (FIG. 16) subtracts DELTA from the epoch offset for each logical partition to compensate for the new host time 1601.

Figure 17:
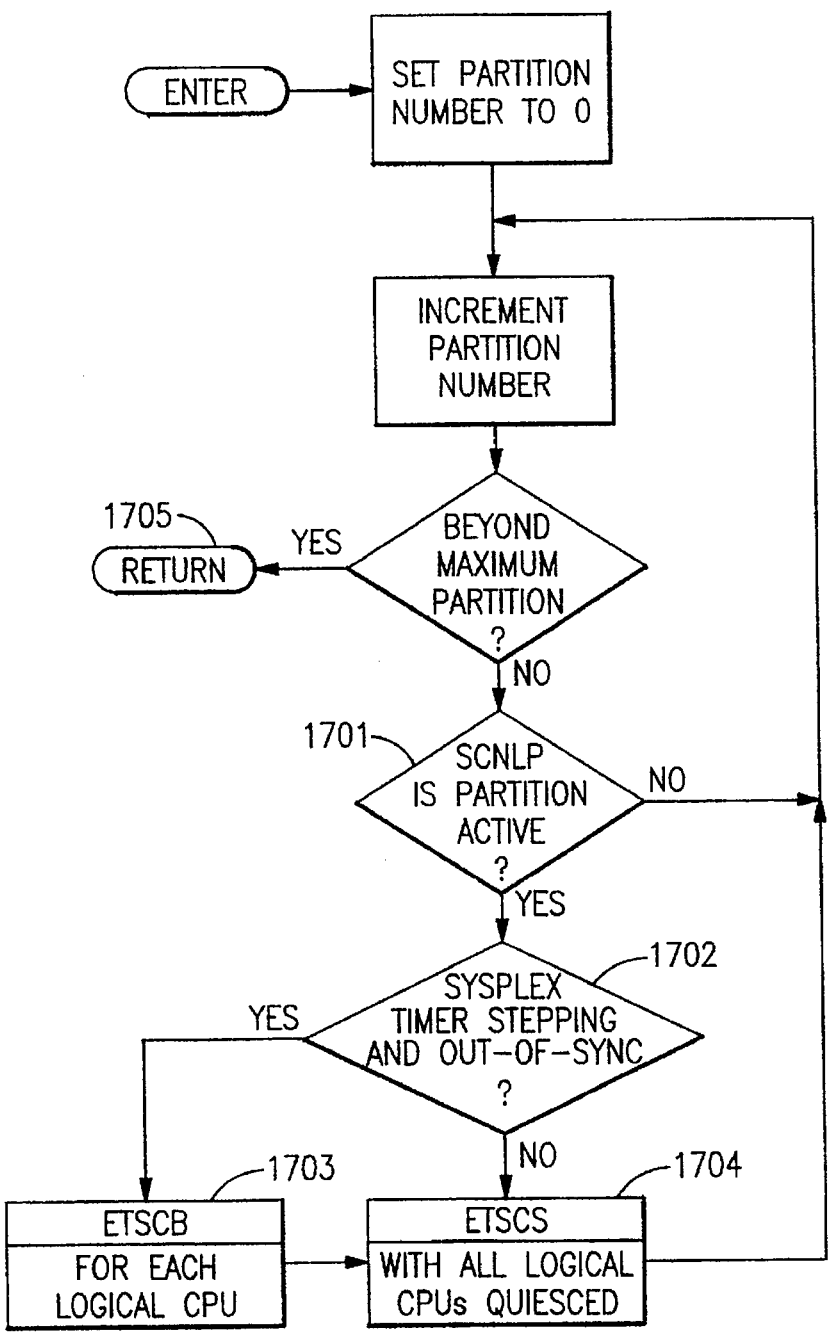
FIG. 17 is a flowchart showing the completion of resynchronization for active partitions.
Figure 18:
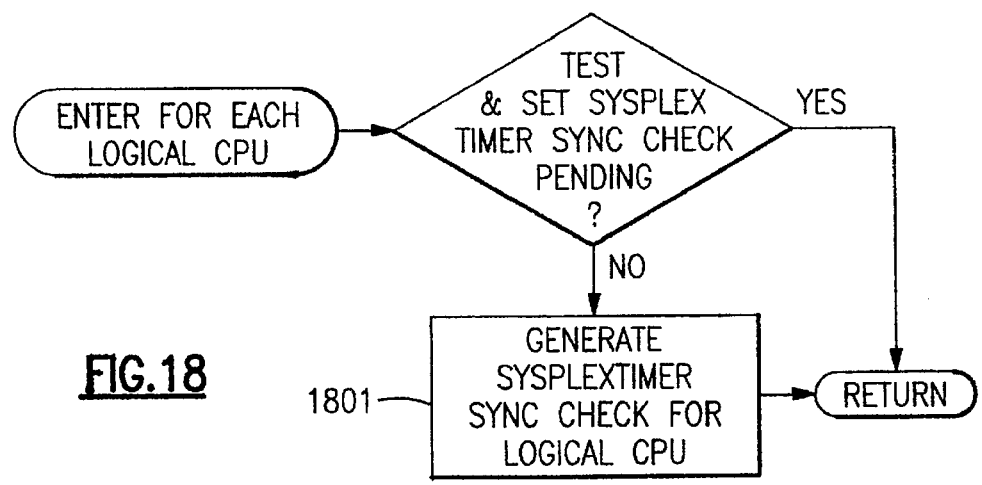
FIG. 18 is a flowchart showing the generation of initial Sysplex Timer sync checks.
Figure 20:
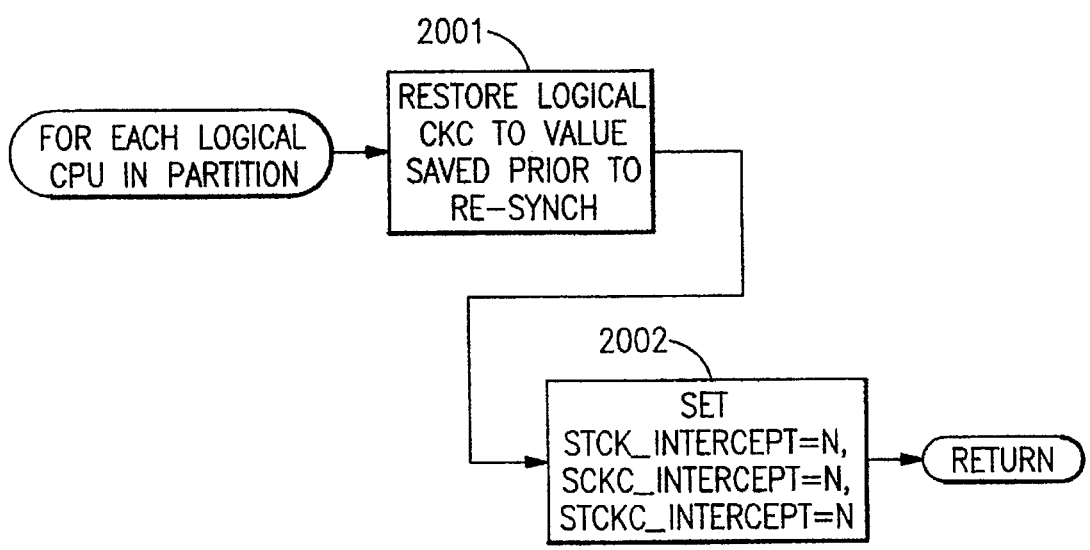
FIG. 20 is a flowchart showing processing for each logical CPU for completion after host resynchronization.
Figure 19:
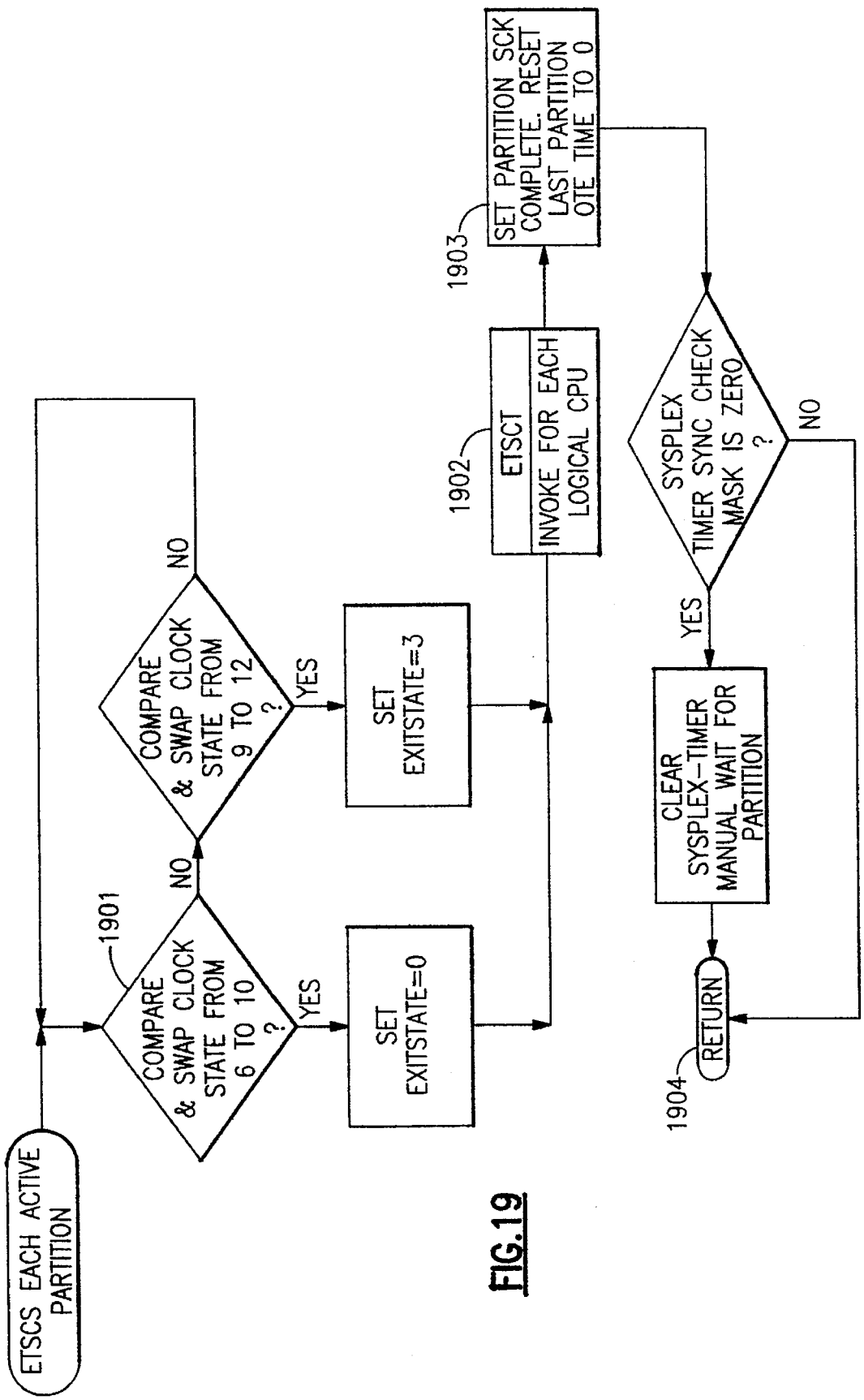
FIG. 19 is a flowchart showing completion for logical partition after host resynchronization.

ETSCA (FIG. 17) checks each active logical partition 1701 for those operating in Sysplex Timer mode that are out of sync 1702. ETSCA calls ETSCB 1703 for those logical partitions that qualify. ETSCB (FIG. 18) generates a Sysplex-Timer-sync-check condition for the respective logical CPU 1801. ETSCA then calls ETSCS to complete logical partition processing for the resynchronization 1704. ETSCS (FIG. 19) updates the clock state 1901 and calls ETSCT 1902 for each logical CPU in the logical partition. ETSCT (FIG. 20) restores the saved value of the logical clock comparator 2001 and disables STCK, SCKC, and STCKC interception 2002. Upon return from ETSCT, ETSCS indicates that the SCK for the logical partition is complete 1903 and returns to ETSCA 1904. When all active logical partitions have been processed, ETSCA returns to ETSYX 1705.

Figure 7:
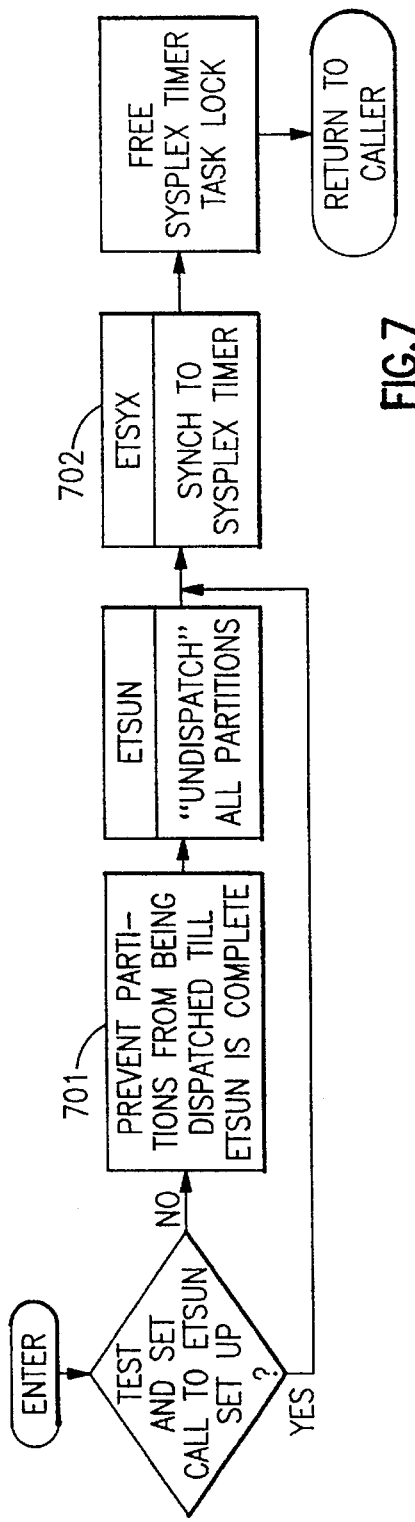
FIG. 7 is a flowchart showing resynchronization processing for a local mode host.
Figure 21:
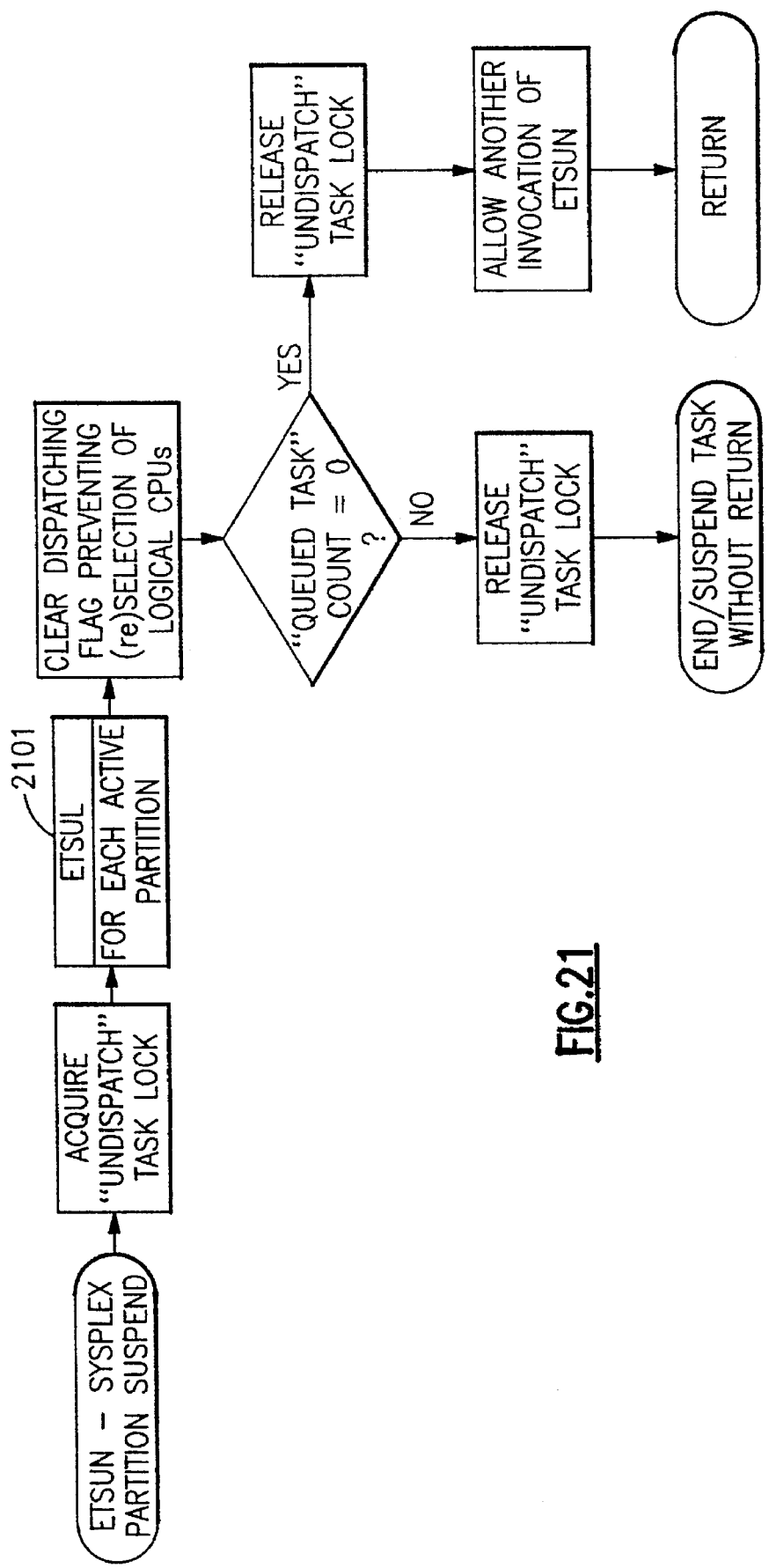
FIG. 21 is a flowchart showing suspension of partitions with Sysplex Timer Stepping enabled in preparation for resynchronization.
Figure 22:
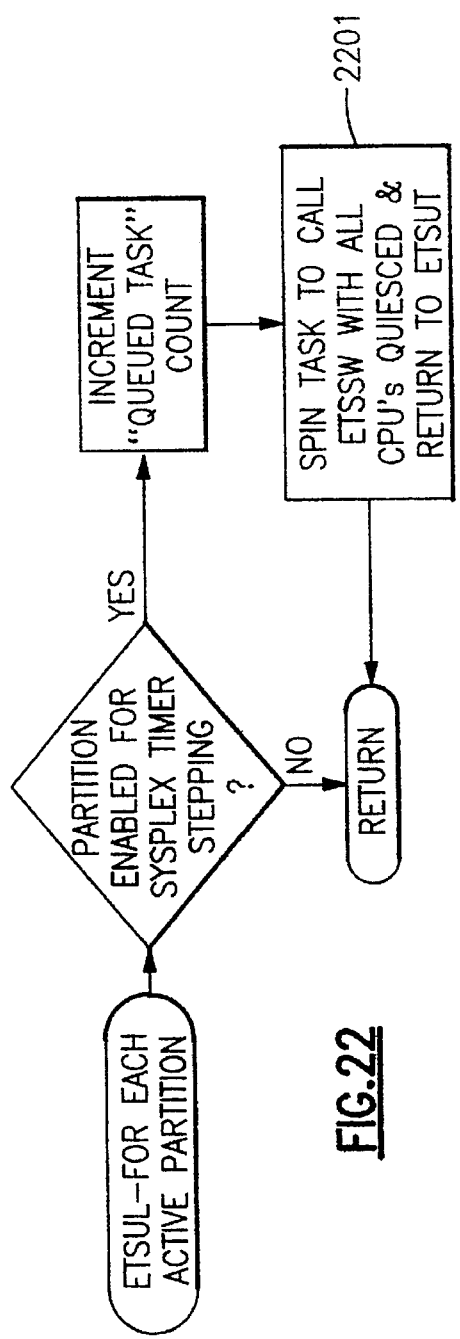
FIG. 22 is a flowchart showing processing for each active logical partition within the overall process of FIG. 21.
Figure 23:
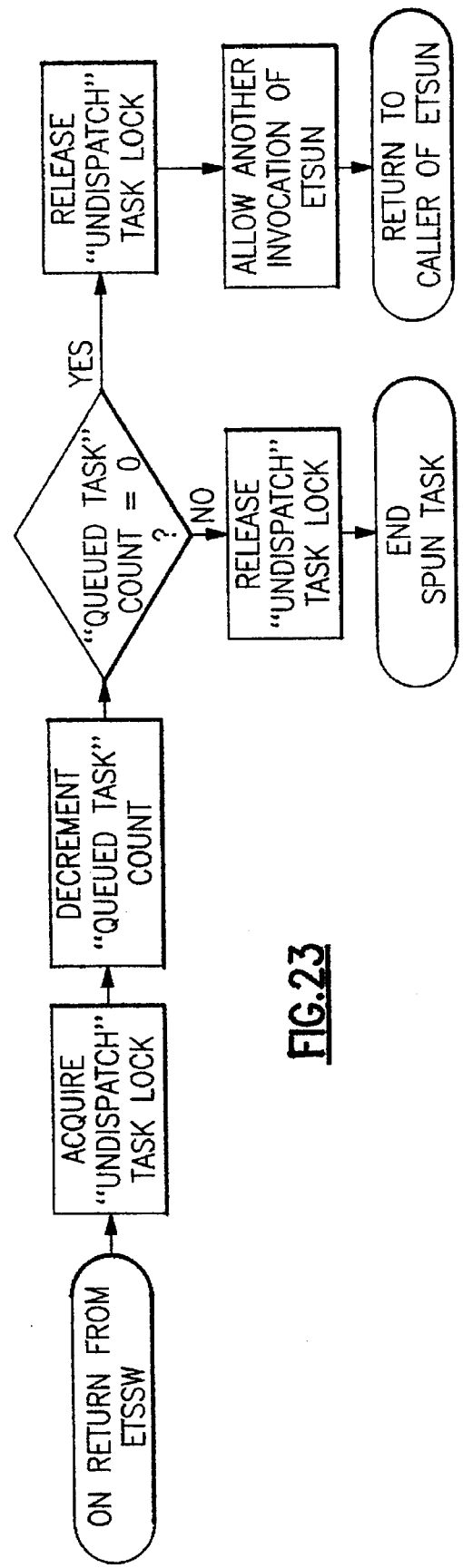
FIG. 23 is a flowchart showing processing performed on return from ETSSW (FIG. 24).
Figure 24:
FIG. 24 is a flowchart showing the placement of a partition in Sysplex Timer Manual Wait.

When the Sysplex Timer becomes operational sometime after host initialization, the host begins a resynchronization process in an attempt to establish TOD clock synchronization with the Sysplex Timer. ETSSY (FIG. 7) prepares for the resynchronization. It prevents partitions from being dispatched 701. ETSUN (FIG. 21) invokes ETSUL 2101. ETSUL (FIG. 22) arranges to have any logical partitions which has enabled its Sysplex Timer stepping port placed in a Sysplex Timer manual wait 2201 (see ETSSW, FIG. 24, and ETSUT, FIG. 23).

ETSUN (FIG. 21) then finishes suspending partitions enabled for Sysplex Timer stepping before returning to ETSSY (FIG. 7). ETSSY calls ETSYX (FIG. 4) to begin the resynchronization process 702.

DESCRIPTION OF LOW-LEVEL SYNC CHECK PROCESSING

When a partition has disabled the host's stepping port, has set the low order word of its logical TOD to a time not equal to that of the Sysplex Timer, or has attempted to enable any stepping port while the host is in local mode, the host will present a simulated sync check at each OTE to the logical partition until the partition clears the condition that is causing the sync check condition.

Figure 25:
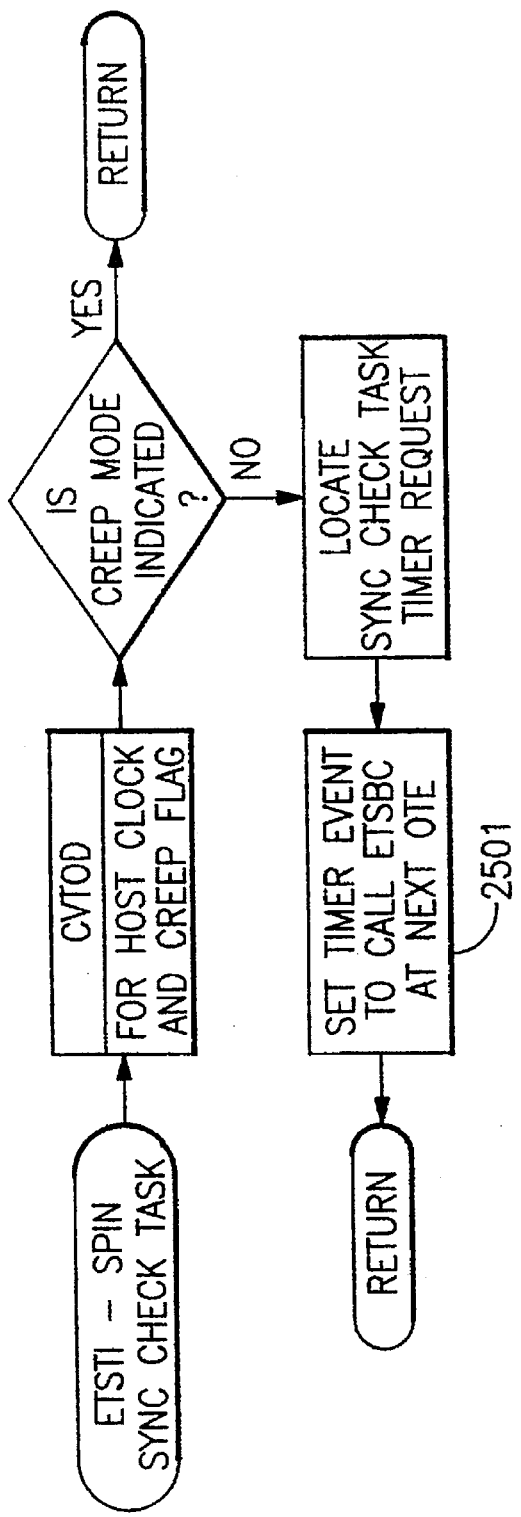
FIG. 25 is a flowchart showing setting up a timer event to call ETSBC (FIG. 26).
Figure 26:
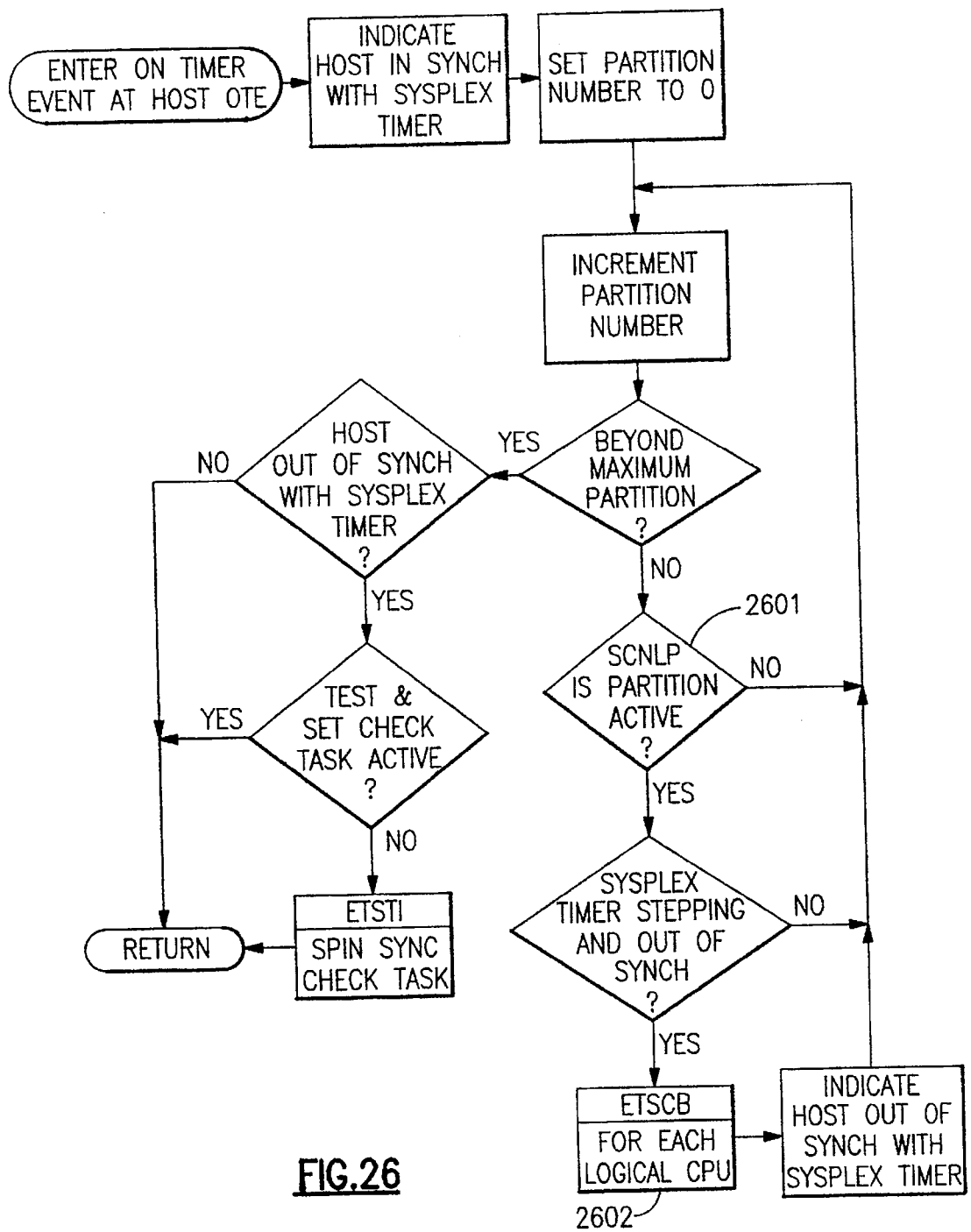
FIG. 26 is a flowchart showing the sync check task initiated by ETSTI (FIG. 25).

ETSTI (FIG. 25) sets up a timer event to call ETSBC 2501 at the next host on-time event. ETSBC (FIG. 26) checks to see if the partition is active 2601, then calls ETSCB (FIG. 18) to generate a Sysplex Timer sync check.

DESCRIPTION OF LOW-LEVEL PORT AVAILABILITY CHANGE PROCESSING

Figure 27:
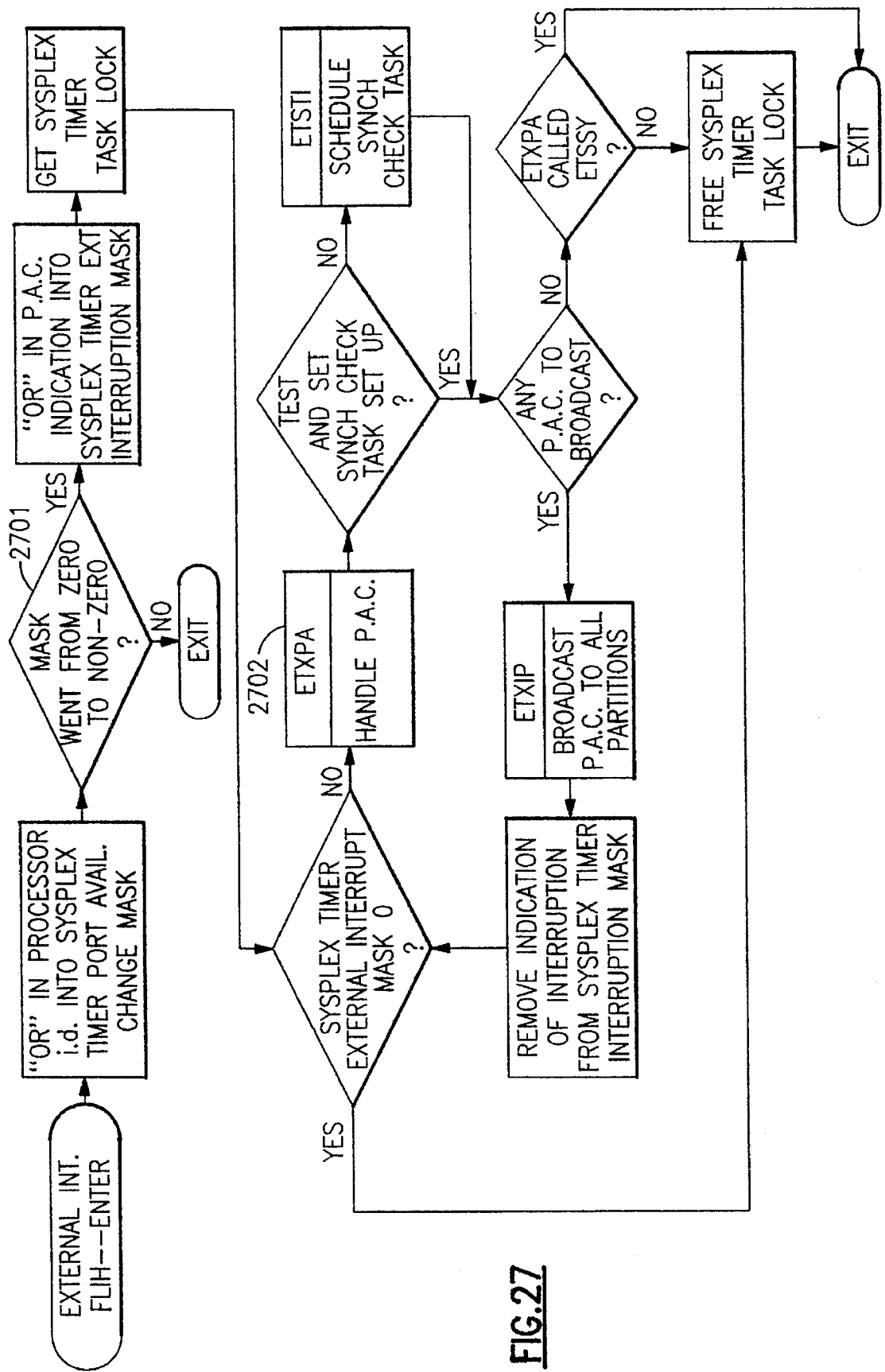
FIG. 27 is a flowchart showing port availability change processing.

When a Sysplex Timer port changes status (e.g from operational to not operational), the host is presented with an external interrupt. ETXPC (FIG. 27) describes port availability change processing. First ETXPC verifies that the ports have changes states 2701 since the last time a port availability external interrupt was received. If they have, ETXPA is called to handle the interrupt 2702.

Figure 28:
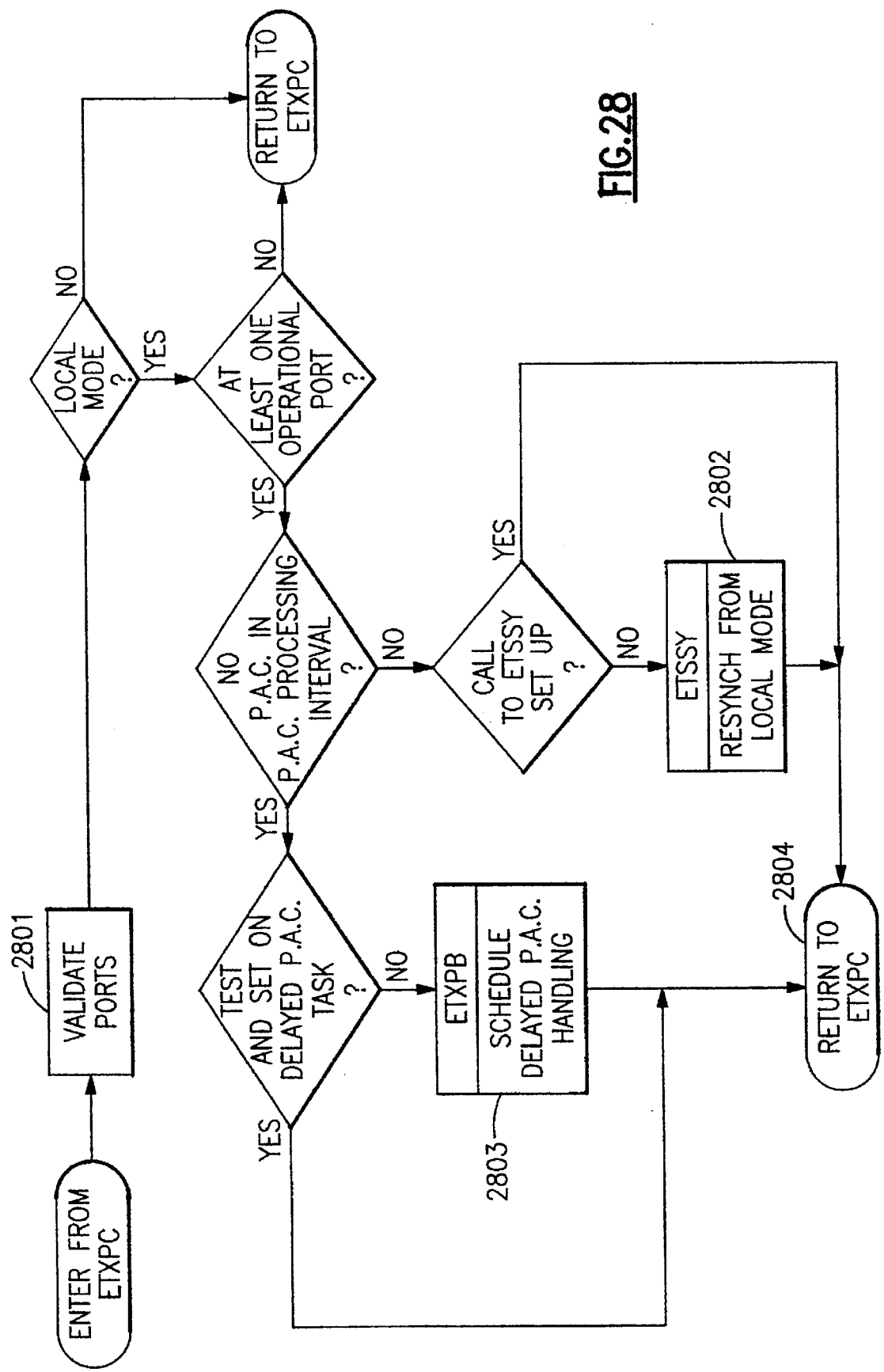
FIG. 28 is a flowchart showing port availability processing in local mode.

ETXPA (FIG. 28) first validates the ETR ports 2801. If the host is currently in local mode and there have been no port availability changes within a predetermined interval, ETSSY (FIG. 7) is called to synchronize the host TODs to the Sysplex Timer 2802. After the synchronization process is complete, control is returned to ETXPC 2804.

Figure 29:
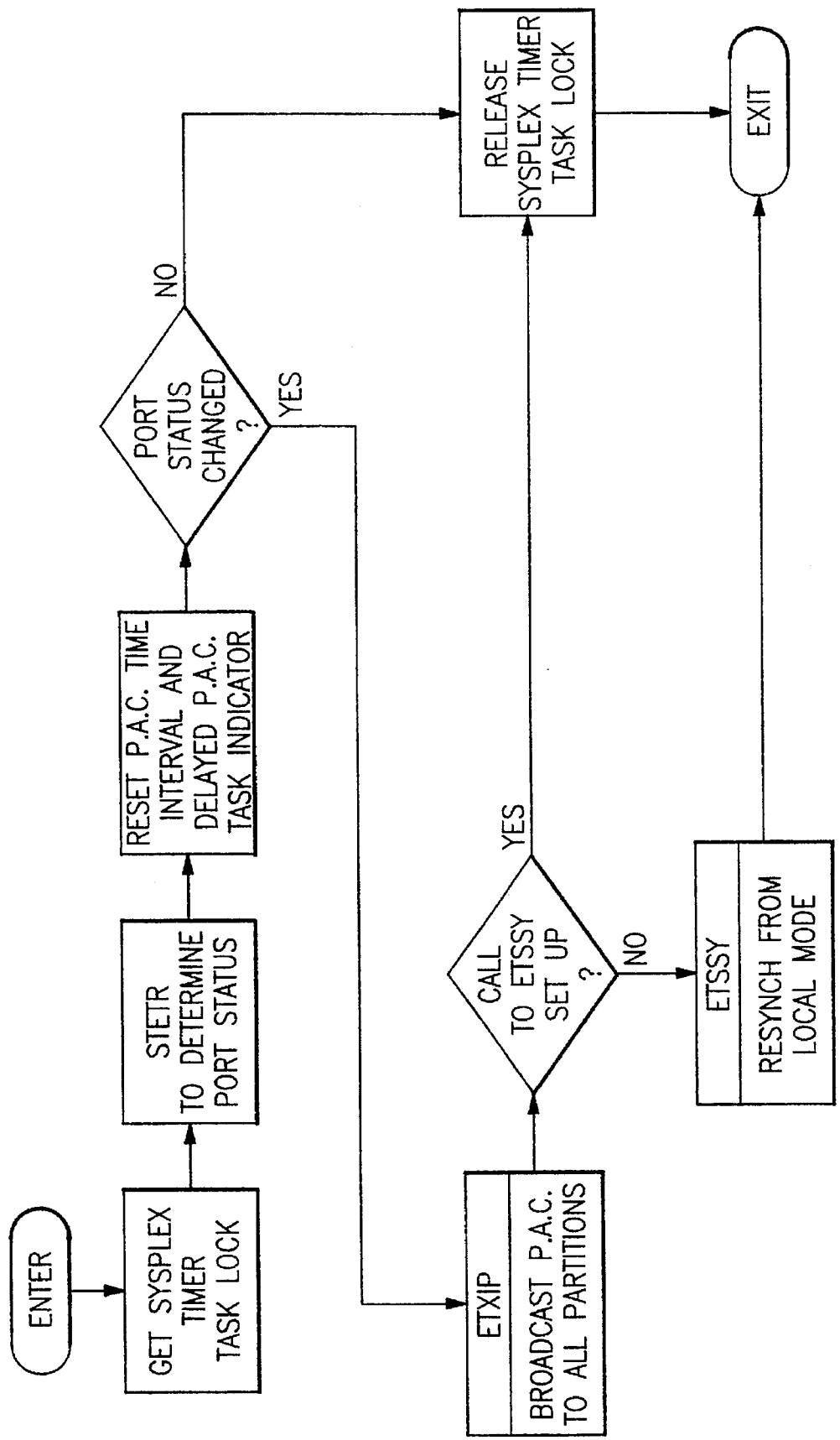
FIG. 29 is a flowchart showing delayed processing of port availability change.

If the host is currently in local mode but has received other port availability changes within a predetermined interval, the host will delay handling the port availability change interrupt until the port status has stabilized 2803 (see ETXPB, FIG. 29).

DESCRIPTION OF ADDITIONAL LOW-LEVEL SET CLOCK INSTRUCTION SIMULATION

Figure 30:
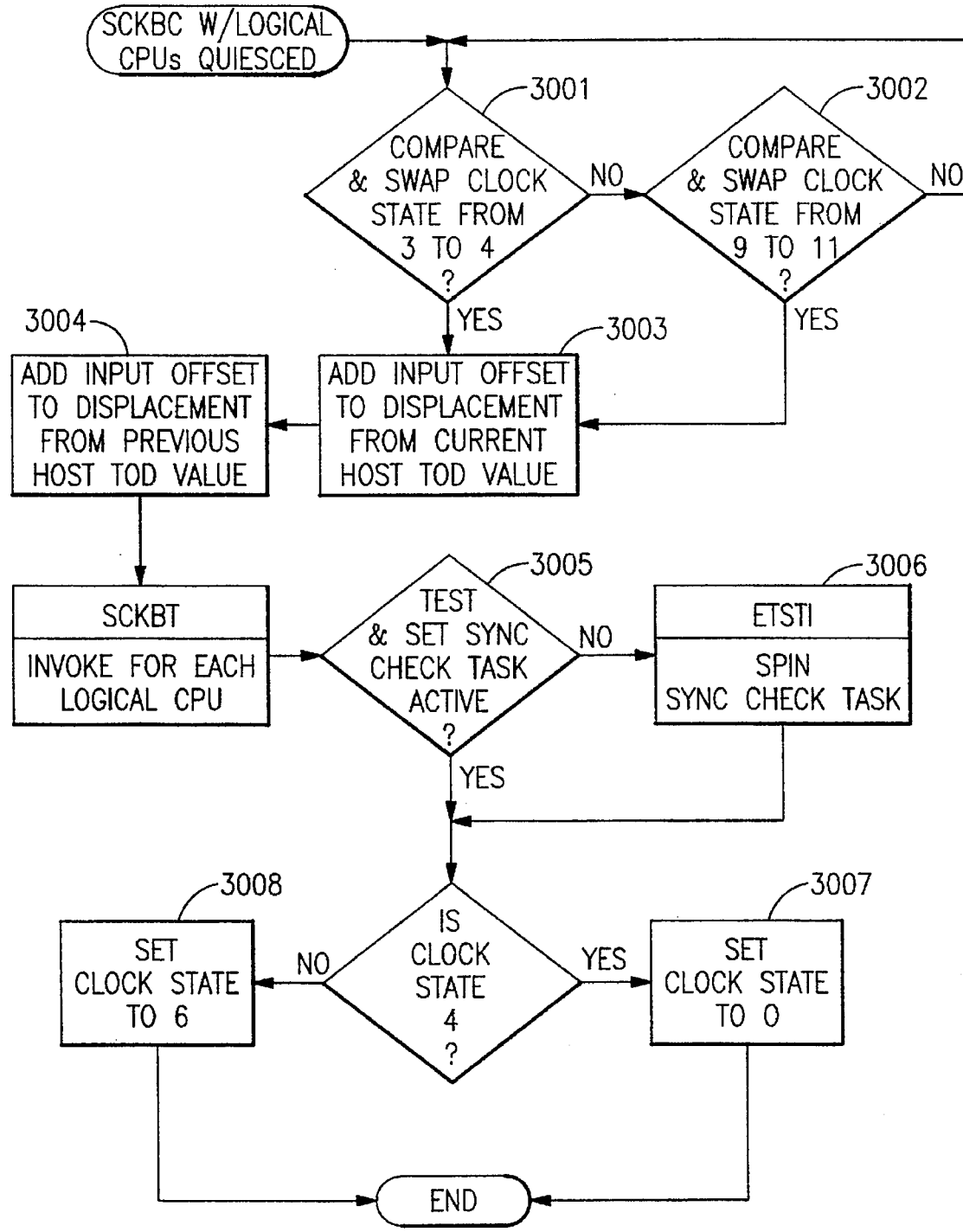
FIG. 30 is a flowchart showing the broadcast for SET CLOCK.

SCKBC (FIG. 30) attempts to change the state of the partition's TOD to four, if the TOD was previously in state three 3001. If the TOD was previously in state nine, it will attempt to change the state of the partition's TOD to eleven 3002. SCKBC then calculates the new displacement from the current host TOD value 3003 and the new displacement from the previous host TOD value 3004.

Figure 31:
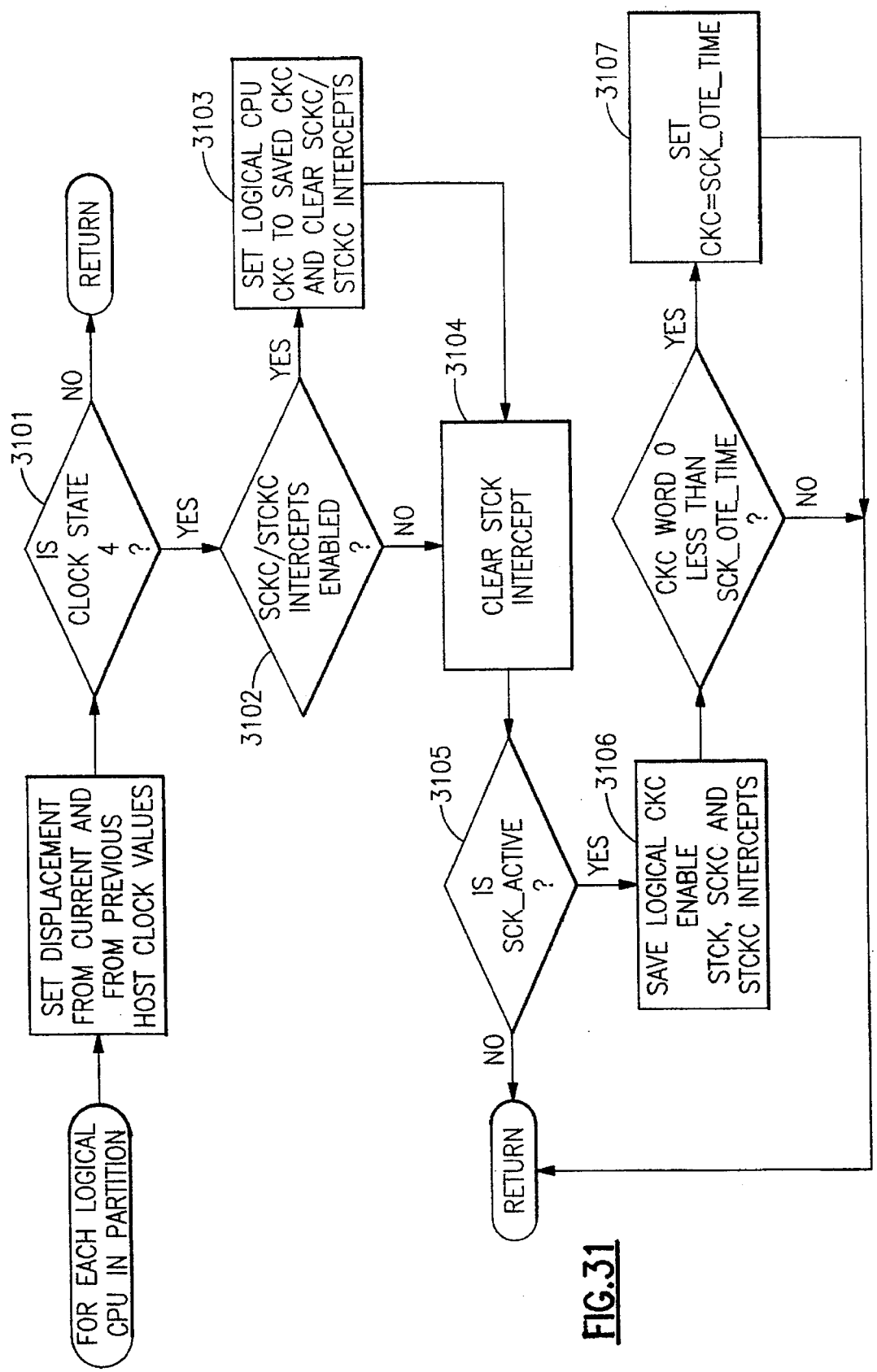
FIG. 31 is a flowchart showing processing for each logical CPU on SET CLOCK broadcast.

SCKBT (FIG. 31) checks to see if the clock state is four. If the clock state is four 3101 and if the SCKC and STCKC intercepts are enabled 3102, the SCKC and STCKC intercepts are disabled 3103. The STCK intercept is disabled 3104. If the partition is attempting to set its logical TOD to synchronize with the Sysplex Timer, the STCK, SCKC and STCKC intercepts are enabled 3106. Also, the clock comparator is set to the expected value of the TOD at the next on-time event if the current value of the clock comparator is less than the expected value of the TOD 3107.

SCKBC then checks to see if a sync check task is active 3005. If one is not active, ETSTI (FIG. 25) sets up a sync check task 2501. Then SCKBC checks the state of the partition's TOD. If the state is four, the state is changed 3007 to 0. Otherwise, the state is changed 3008 to 6.

DESCRIPTION OF LOW-LEVEL SET CLOCK COMPARATOR INSTRUCTION SIMULATION

Figure 32:
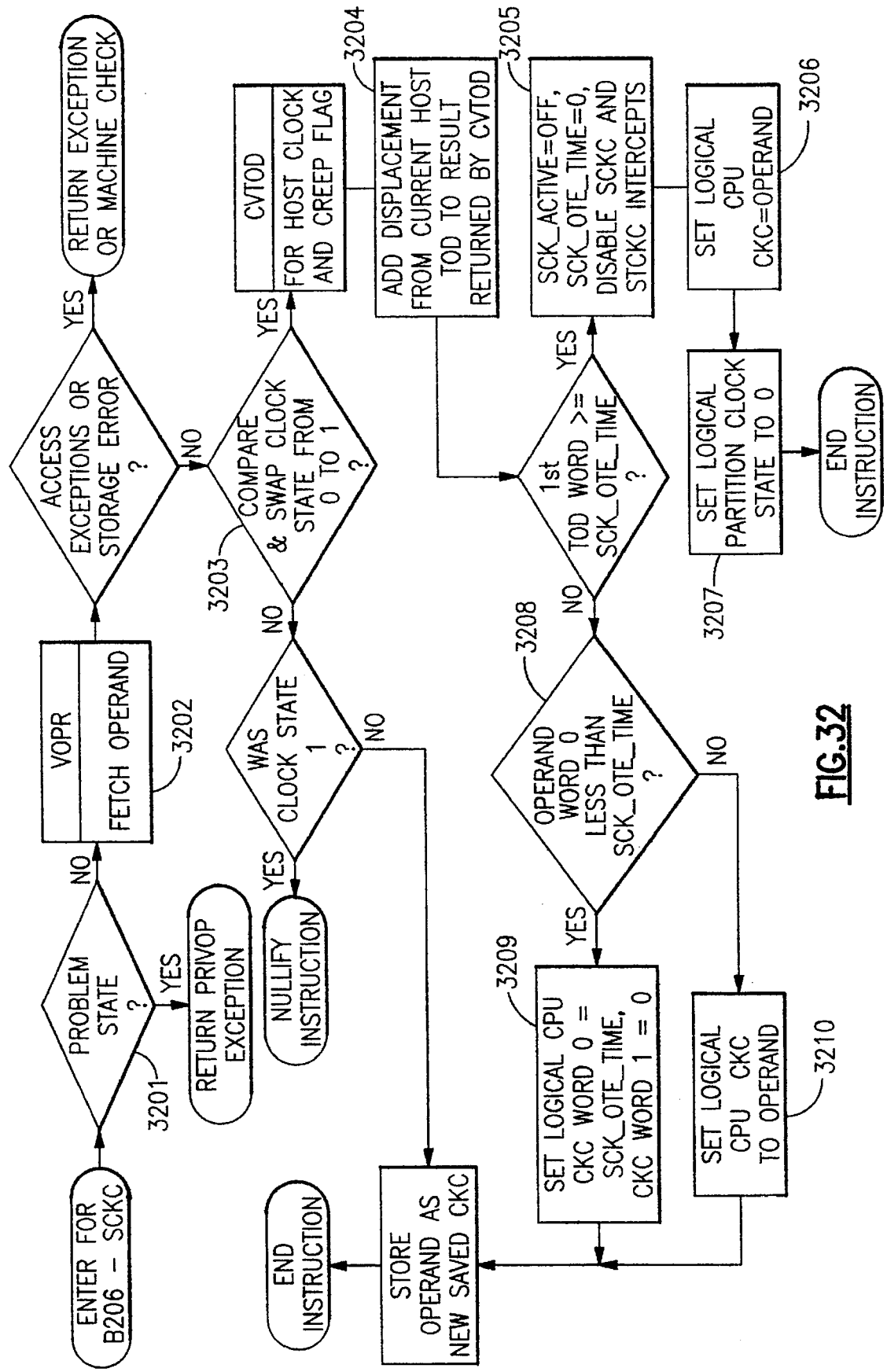
FIG. 32 is a flowchart showing execution of intercepted SET CLOCK COMPARATOR instructions.
Figure 38:
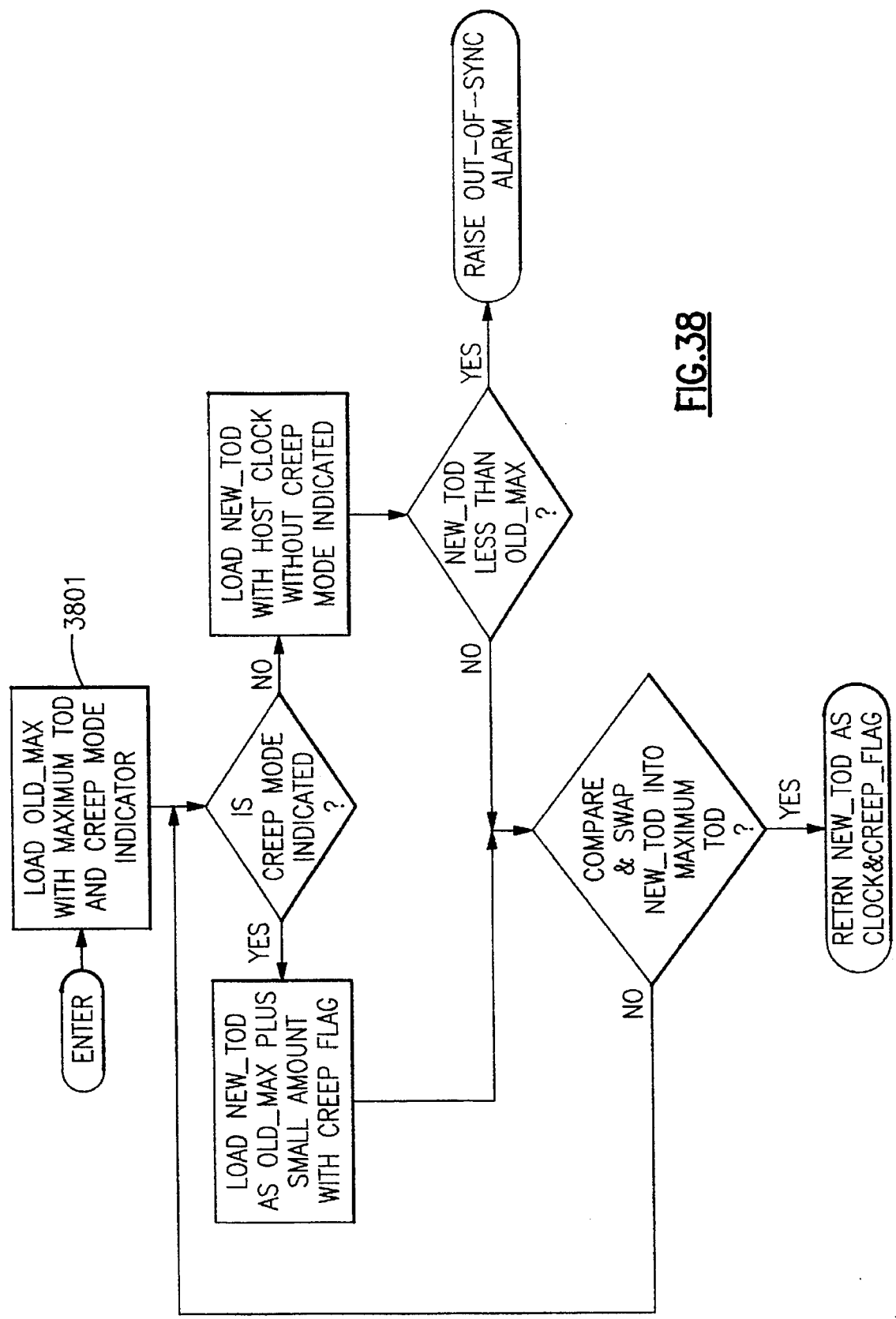
FIG. 38 is a flowchart showing the obtaining of host clock and creep mode indicator.

SCKCSM (FIG. 32) first verifies that the partition is in a valid state to execute the SCK instruction 3201. If the partition is in a valid state, SCKCSM fetches the partition's operand 3202. The logical partition's TOD clock is moved from state 0 to state 1, 3203. CVTOD (FIG. 38) obtains the last stored value of the host TOD and the creep mode indicator 3801. SCKCSM then calculates the partition's TOD by adding the partition's epoch offset to the host TOD value 3204.

If the high order word of the partition's TOD is greater than or equal to the expected value of the TOD at the next on time event, the intercept enablement for the SCKC and STCKC instructions are disabled 3205, the logical CPU clock comparator is set 3206, and the partition's TOD clock is moved from state 1 to state 0, 3207.

If the high order word of the partition's TOD is less than the expected value of the TOD at the next on time event, the low order word of the TOD is checked 3208. If it is less than the expected value of the TOD at the next on time event, then the logical clock comparator's low order word is cleared and the high order word is replaced with the expected value of the TOD at the next on time event. Otherwise, the original operand, as specified by the partition, is used to set the logical CPU clock comparator 3210.

DESCRIPTION OF LOW-LEVEL STCKC INSTRUCTION SIMULATION

Figure 33:
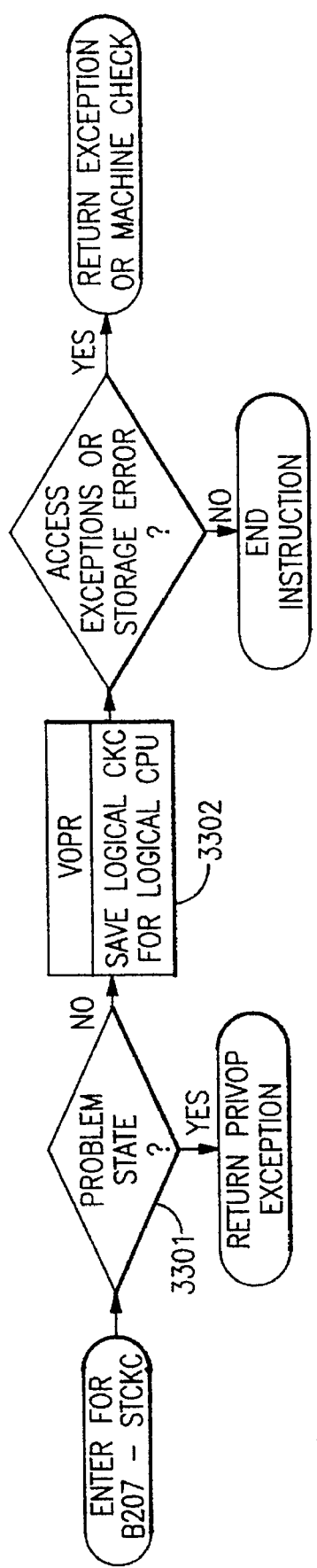
FIG. 33 is a flowchart showing execution of intercepted STORE CLOCK COMPARATOR instructions.

STCKCSM (FIG. 33) first verifies that the partition is in a valid state to execute the STCKC instruction 3301. If the partition is in a valid state, then the logical clock comparator for the logical CPU is stored into partition storage 3302.

DESCRIPTION OF LOW-LEVEL SYSPLEX TIMER CONTROL SIMULATION

Figure 35:
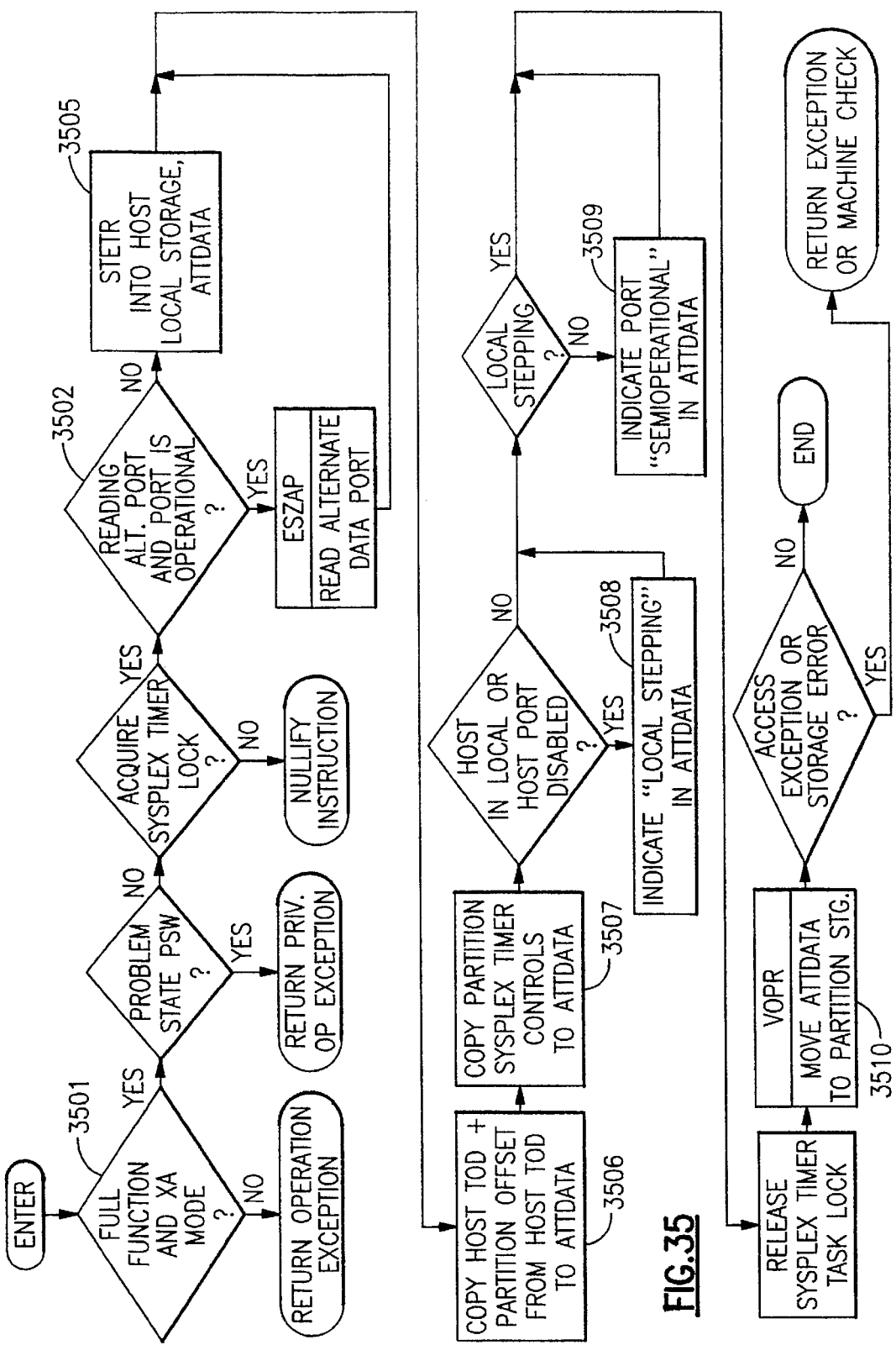
FIG. 35 is a flowchart showing store simulated Sysplex Timer attachment controls.

When a logical partition requests to read Sysplex Timer Attachment information, ESZST (FIG. 35) first verifies that the partition has Sysplex Timer support and that the partition is in a valid state to issue the request 3501. It then checks to see if the partition wishes to read data from the host's data port or the alternate data port 3502.

Figure 37:
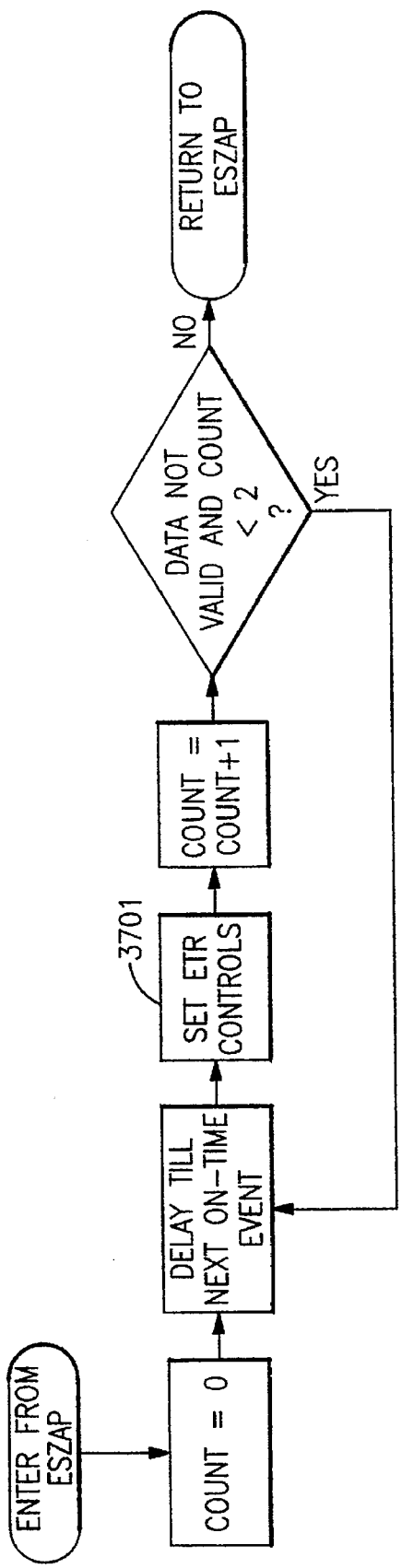
FIG. 37 is a flowchart showing the switching of data ports.
Figure 36:
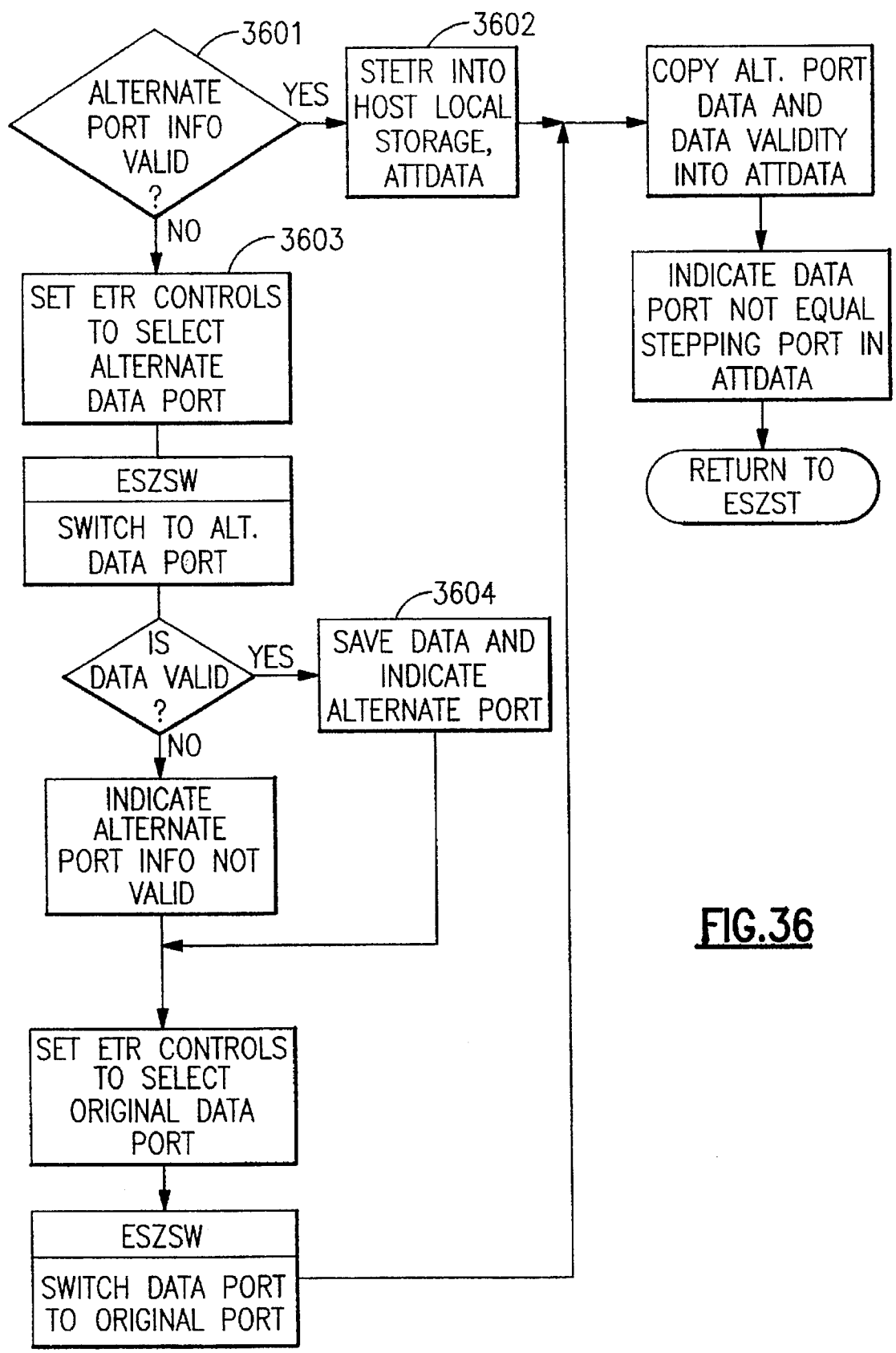
FIG. 36 is a flowchart showing read alternate data port processing.

If the partition chooses to read data from the host's data port, then the Sysplex Timer Attachment information is read and stored into host working storage 3505. Otherwise, ESZAP (FIG. 36) will check for alternate port data validity 3601. If data already in the host's possession is valid, that data is copied into working store 3602. Otherwise, the host will read the alternate port 3603. If the data read is valid, it is stored into host working storage 3604. ESZSW (FIG. 37) then switches the host's data port back to the original port 3701.

Once the data from the appropriate data port is collected, the logical partition's TOD value is stored 3506, along with a copy of the partition's Sysplex Timer Attachment controls 3507, into host working storage. If the host is in local mode or if the partition has disabled the host's stepping port, the local stepping mode indicator is copied into host working storage 3508. If the partition is in Sysplex Timer stepping mode, the alternate port is marked 'semi-operational' in host working storage 3509. The data from host working storage is then copied into partition storage 3510.

Figure 34:
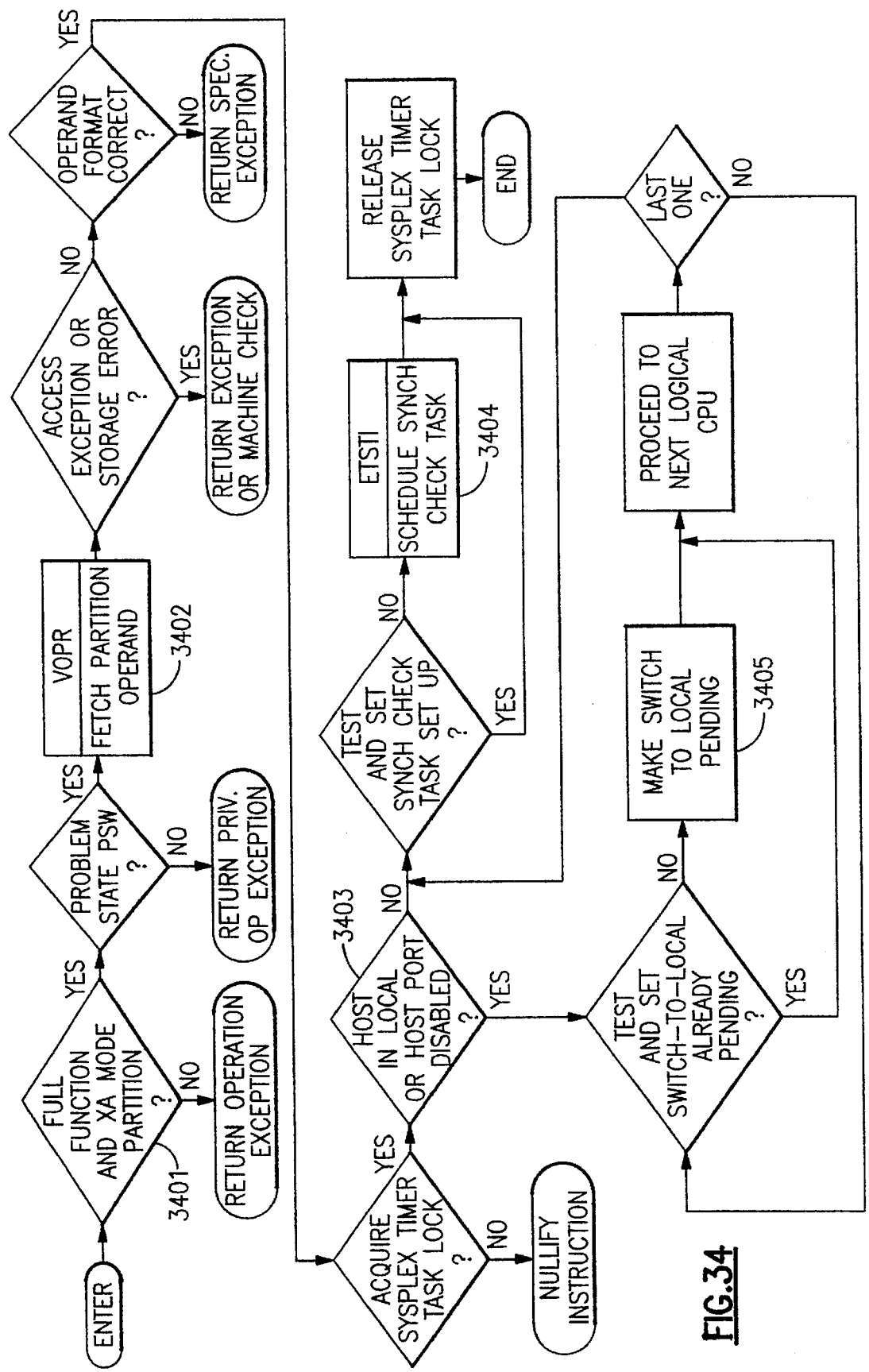
FIG. 34 is a flowchart showing set simulated Sysplex Timer attachment controls SETR instruction simulation.

When a logical partition wishes to set its Sysplex Timer controls, ESZSE (FIG. 34) first verifies that the partition has Sysplex Timer support and that the partition is in a valid state to issue the request 3401. It checks the partition's controls for errors and stores it for future use 3402. Then it checks to see if the host is in local mode or if the partition has disabled the host's stepping port 3403. If either case is found to be true, it makes a switch-to-local machine check pending for each logical CPU belonging to the partition 3405. Otherwise, it schedules a sync check task, ETSTI (FIG. 25), to run if one hasn't been scheduled already 3404.

EXAMPLES

Example 1

In this example, the host system of FIG. 1 is operating in Sysplex Timer mode when the Sysplex Timer value is changed by a CPC operator.

Initially:
1. The CPC is placed into LPAR mode and LPAR synchronizes the physical TODs with the Sysplex Timer.
2. Partition A (FIG. 1, 106) is activated but has no Sysplex Timer support. Partition B is activated and DOES have Sysplex Timer support and has synchronized its logical TOD with the Sysplex Timer.

The Sysplex Timer time is changed. The Sysplex Timer temporarily drops into local mode while it internally establishes its new time. All Sysplex Timer ports appear "non-operational."

3. LPAR is notified by the CPC that there are no operational ports. LPAR drops into local mode.
4. Partition A continues operating unaffected.
5. Partition B is notified that there are no operational ports. Partition B drops into local mode.

The Sysplex Timer has internally established its new time. It signals the CPC that all ports are now operational.

6. LPAR is notified that all Sysplex Timer ports are now operational. LPAR reestablishes physical TOD clock synchronization with the Sysplex Timer.
7. LPAR establishes a time displacement for each logical partition that causes each logical partition to continue its time stream without any displacement caused by the change in Sysplex Timer values.
8. Outcome:
   Partition A continues operating unaffected.
   Partition B is notified that all ports are now operational. It may now resynchronize its logical TOD to the new Sysplex Timer value.

Example 2

The host system of FIG. 1 is operating in Sysplex Timer mode when its primary TOD clock drifts out of synchronization with the Sysplex Timer value.

Initially:
1. The CPC is placed into LPAR mode and all physical TODs are synchronized to the Sysplex Timer.
2. Partition A is activated but has no Sysplex Timer support. Partition B is activated and DOES have Sysplex Timer support and is operating in Sysplex Timer mode.

The host's primary TOD clock drifts out of synchronization with the Sysplex Timer:
1. LPAR becomes aware that the TOD clock is out of synchronization with the Sysplex Timer, and reestablishes TOD clock synchronization with the Sysplex Timer.
2. LPAR establishes a time displacement for each logical partition that causes each logical partition to continue its time stream without any displacement caused by the change in Sysplex Timer value.
3. Outcome
   Partition A continues operating using its old time base.
   Partition B, because it is operating in Sysplex Timer mode, is notified that it is now out of synchronization with the Sysplex Timer and it resynchronizes, joining the new time stream in synchronization with the Sysplex Timer value.

The invention claimed is:

1. A method for synchronizing a logical clock in a logical partition executing on a host processor having a host clock and controlled by a hypervisor, with an external time source connected to the host processor, said logical clock having a value created by arithmetically combining said host clock with a value specific to said logical partition, said method comprising the steps, performed by said hypervisor, of:
   a) detecting a need for synchronization between the external time source and the host clock;
   b) insulating the logical partition from host clock synchronization after said step of detecting said need for synchronization;
   c) synchronizing the host clock with the external time source;
   d) calculating a clock adjustment value for use by said hypervisor in maintaining consistency of said logical clock with said host clock;
   e) applying said clock adjustment value to said value specific to said logical partition by arithmetically combining said clock adjustment value with said value specific to said logical partition; and
   f) synchronizing said logical clock with said external time source after said host clock has been synchronized with said external time source if said logical partition is executing in a mode having access to said external time source.

2. The method of claim 1 in which said synchronizing step f) comprises the step of setting a notification to synchronize the logical clock with the external time source, after said step of synchronizing the host clock with the external time source, if the logical partition is executing in a mode having access to the external time source.

3. The method of claim 1 in which said step insulating comprises the steps of:
   a) preventing a user task dispatch within the partition during said host clock synchronization; and
   b) setting a control to intercept a timer facility instruction.

4. The method of claim 3 in which said step of insulating further comprises the step of setting a creep mode indicator for said host clock, said creep mode indicator causing a simulation of any store clock instruction during said host clock synchronization by incrementing, by a small positive value, a last host clock value on each said store clock instruction.

5. The method of claim 3 in which said step of insulating further comprises the step of setting a dummy value of a clock comparator, said dummy value being chosen to prevent a clock comparator interruption from occurring during said host clock synchronization.

6. The method of claim 1 in which said step of detecting a need for synchronization comprises detecting a sync check.

7. The method of claim 1 in which said step of detecting a need for synchronization comprises having an "external time source operational" interruption recognized by said host processor.

8. The method of claim 1 further comprising the step of applying said clock adjustment value, by said hypervisor, to one or more time expiration values in one or more queued host tasks.

9. The method of claim 1 in which said step of synchronizing the host clock with the external time source comprises the steps of:
   a) reading in a time value from said external time source;
   b) saving a host clock value at start of said synchronizing and at completion of said synchronizing;
   c) replacing said host clock value with said time value read from said external time source; and
   d) saving a synchronizing time period indicating time length for said step of synchronizing;
   and in which said step of calculating a clock adjustment value comprises the step of subtracting from said saved host clock value at completion of said synchronization, the sum of said saved host clock value at start of said synchronizing added to said synchronizing time period.

10. The method of claim 1 in which a plurality partitions, each having a logical clock, execute on said host processor.

11. An apparatus for synchronizing logical and physical clocks in a logically partitioned data processing system having at least one logical partition, and having a hypervisor, said apparatus comprising:
   a) a host processor, having a host clock;
   b) a logical clock in said at least one logical partition, said logical clock having a value created by arithmetically combining said host clock with a value specific to said logical partition;
   c) an external time source connected to said host processor;
   d) means for detecting a need for synchronization condition between the external time source and said host clock;
   e) means for insulating said at least one logical partition from host clock synchronization during host clock synchronization after said detecting of said need for synchronization;
   f) means for synchronizing said host clock with said external time source;
   g) means for modifying said logical clock, by calculating a clock adjustment value and applying said clock adjustment value to said value specific to said logical partition by arithmetically combining said clock adjustment value with said value specific to said logical partition, so that logical clock consistency is maintained despite said host clock synchronization; and
   h) synchronizing the logical clock with the external time source after said host clock has been synchronized with said external time source if the logical partition is executing in a mode having access to the external time source.

12. The apparatus of claim 11 in which said means for insulating comprises:
   a) means for preventing a user dispatch within said at least one logical partition during said host clock synchronization; and
   b) means for intercepting and simulating execution of a timer instruction, said simulating providing functional equivalence to said timer instruction.

13. The apparatus of claim 12 in which said means for intercepting and simulating execution comprises a creep mode indicator means for adjusting a host clock value associated with said host clock, said creep mode indicator means, when set, causing a simulation of any store clock instruction during said host clock synchronization by incrementing, by a small positive value, a last host clock value on each said store clock instruction.

14. The apparatus of claim 12 in which said means for insulating further comprises a dummy clock comparator, said dummy clock comparator being chosen to prevent a clock comparator interruption from occurring during said host clock synchronization.

15. The apparatus of claim 11 in which said means for detecting a need for synchronization comprises means for detecting a sync check.

16. The apparatus of claim 11 in which said means for detecting a need for synchronization comprises means for recognizing an "external time source operational" interruption by said host processor.

17. The apparatus of claim 11 in which said data processing system has a plurality of logical partitions, each having a logical clock.

18. A method for synchronizing a logical clock in a logical partition executing on a host processor having a host clock, and controlled by a hypervisor, with an external time source connected to the host processor, said logical clock having a value created by arithmetically combining said host clock with a value specific to said logical partition, said method comprising the steps, performed by said hypervisor, of:
   a) detecting a synchronization check indicating an out-of-synchronization condition between the external time source and the host clock;
   b) insulating the logical partition from host clock synchronization after said detecting of said synchronization check, said step of insulating further comprising the steps of:
      i) preventing a user dispatch within the logical partition during said host clock synchronization;
      ii) setting a control to intercept a timer facility instruction;
      iii) setting a creep mode indicator for said host clock, said creep mode indicator causing a simulation of any store clock instruction during said host clock synchronization by incrementing, by a small positive value, a last host clock value on each said store clock instruction; and iv) setting a dummy value of a clock comparator, said dummy value being chosen to prevent a clock comparator interruption from occurring during said host clock synchronization;

c) synchronizing the host clock with the external time source;

d) calculating a clock adjustment value for use by said hypervisor in maintaining clock consistency;

e) applying said clock adjustment value to said value specific to said logical partition by arithmetically combining said clock adjustment value with said value specific to said logical partition; and f) setting a notification to synchronize the logical clock with the host clock and the external time source, after said synchronizing of the host clock with the external time source, if the logical partition is executing in a mode having access to the external time source.

19. An apparatus for synchronizing logical and physical clocks in a logically partitioned data processing system having at least one logical partition and having a hypervisor, said apparatus comprising:

a) a host processor having a host clock;

b) a logical clock in said at least one logical partition, said logical clock having a value created by arithmetically combining said host clock with a value specific to said logical partition;

c) an external time source connected to said host processor;

d) means for detecting a synchronization check between the external time source and said host clock;

e) means for insulating said at least one logical partition from host clock synchronization during host clock synchronization after said detecting of said synchronization check, said means for insulating further comprising:

i) means for preventing a user dispatch within said at least one logical partition during said host clock synchronization;

ii) means for intercepting and simulating execution of a timer instruction, said simulation providing function equivalence to said timer instruction, said means for intercepting and simulating execution comprising a creep mode indicator means for adjusting a host clock value associated with said host clock, said creep mode indicator means, when set, causing a simulation of any store clock instruction during said host clock synchronization by incrementing, by a small positive value, a last host clock value on each said store clock instruction; and iii) a dummy clock comparator, said dummy clock comparator being chosen to prevent a clock comparator interruption from occurring during said host clock synchronization;

f) means for synchronizing said host clock with said external time source; and g) means for modifying said logical clock by calculating a clock adjustment value and applying said clock adjustment value to said value specific to said logical partition by arithmetically combining said clock adjustment value with said value specific to said logical partition so that logical clock consistency is maintained despite said host clock synchronization.

20. A method for synchronizing a logical clock in a logical partition executing on a host processor having a host clock with an external time source connected to the host processor, said logical clock having e value created by arithmetically combining a host clock value with a value specific to said logical partition, said method comprising the steps of:

synchronizing said host clock with said external time source, said host clock having an initial value before synchronization with said external time source and a final value after synchronization with said external time source;

calculating a clock adjustment value as a function of the difference between said initial and final host clock values; and applying said clock adjustment value to said logical partition by arithmetically combining said clock adjustment value with said value specific to said logical partition; and synchronizing said logical clock with said external time source after said host clock has been synchronized with said external time source if said logical partition is executing in a mode having access to said external tame source.

21. Apparatus for synchronizing a logical clock in a logical partition executing on e host processor having a host clock with an external time source connected to the host processor, said logical clock having a value created by arithmetically combining a host clock value with a value specific to said logical partition, said apparatus comprising:

means for synchronizing said host clock with said external time source, said host clock having an initial value before synchronization with said external time source and a final value after synchronization with said external time source;

means for calculating a clock adjustment value as a function of the difference between said initial and final host clock values; and means for applying said clock adjustment value to said logical partition by arithmetically combining said clock adjustment value with said value specific to said logical partition; and means for synchronizing said logical clock with said external time source after said host clock has been synchronized with said external time source if said logical partition is executing in a mode having access to said external time source.

* * * * *